(12) United States Patent
Cullano et al.

(10) Patent No.: US 9,406,324 B1
(45) Date of Patent: Aug. 2, 2016

(54) THIN FILM CONFIGURED TO PRESERVE ALUMINA HEIGHT IN A MAGNETIC RECORDING HEAD AND METHODS OF MAKING THE SAME

(71) Applicant: HGST Netherlands B.V., Amsterdam (NL)

(72) Inventors: Jan Vincent Cullano, Batangas (PH); Estela Paguio, Laguna (PH); Mary Agnes G. Perez, Parañaque (PH)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/793,702

(22) Filed: Jul. 7, 2015

(51) Int. Cl.
*G11B 5/40* (2006.01)
*G11B 5/255* (2006.01)
*G11B 5/31* (2006.01)
*G11B 5/60* (2006.01)

(52) U.S. Cl.
CPC *G11B 5/40* (2013.01); *G11B 5/255* (2013.01); *G11B 5/3106* (2013.01); *G11B 5/6005* (2013.01)

(58) Field of Classification Search
None
See application file for complete search history.

(56) References Cited

U.S. PATENT DOCUMENTS

| 5,175,658 | A | * | 12/1992 | Chang et al. | G11B 5/6005 360/234.5 |
| --- | --- | --- | --- | --- | --- |
| 5,805,380 | A | * | 9/1998 | Ishihara et al. | C23C 14/024 360/235.2 |
| 6,027,660 | A | | 2/2000 | Hsiao et al. | |
| 6,038,101 | A | * | 3/2000 | Yoda et al. | B82Y 10/00 360/235.2 |
| 6,635,184 | B1 | | 10/2003 | Cohen et al. | |
| 6,639,755 | B2 | | 10/2003 | Boutaghou et al. | |
| 7,777,990 | B2 | * | 8/2010 | Shiramatsu et al. | G11B 5/3133 360/128 |
| 8,603,348 | B2 | | 12/2013 | Cheng et al. | |
| 2002/0134672 | A1 | * | 9/2002 | Hwang et al. | 204/192.32 |
| 2003/0133227 | A1 | * | 7/2003 | Anan et al. | 360/236.3 |
| 2004/0061092 | A1 | | 4/2004 | Brankovic et al. | |
| 2007/0115589 | A1 | * | 5/2007 | Huang et al. | 360/235.1 |
| 2010/0291294 | A1 | * | 11/2010 | Ueda et al. | 427/127 |
| 2010/0302685 | A1 | * | 12/2010 | Yamada et al. | 360/245.3 |
| 2013/0215534 | A1 | | 8/2013 | Jones et al. | |
| 2014/0153136 | A1 | * | 6/2014 | Flint et al. | 360/235.1 |

* cited by examiner

*Primary Examiner* — Carlos E Garcia
(74) *Attorney, Agent, or Firm* — Zilka-Kotab, PC

(57) ABSTRACT

According to one embodiment, a magnetic head slider includes: a leading edge, and a trailing edge; a media facing side (MFS) extending between the leading edge and the trailing edge; a first region located near the trailing edge, and a second region located between the first region and the leading edge; a center rail comprising: a forward segment protruding from the first region of the slider, and a posterior segment protruding from the second region of the slider; a rear rail protruding from the second region of the slider; and a secondary protective film deposited on one or more portions of the first region.

17 Claims, 28 Drawing Sheets

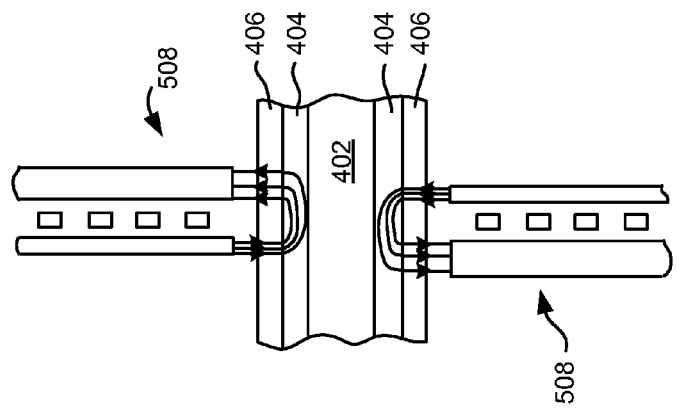
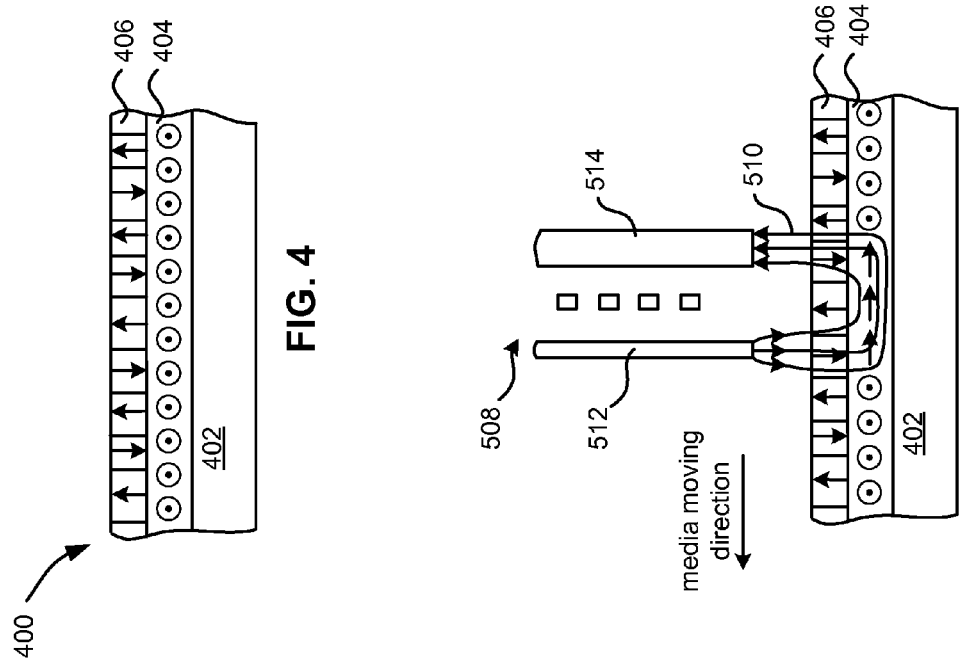

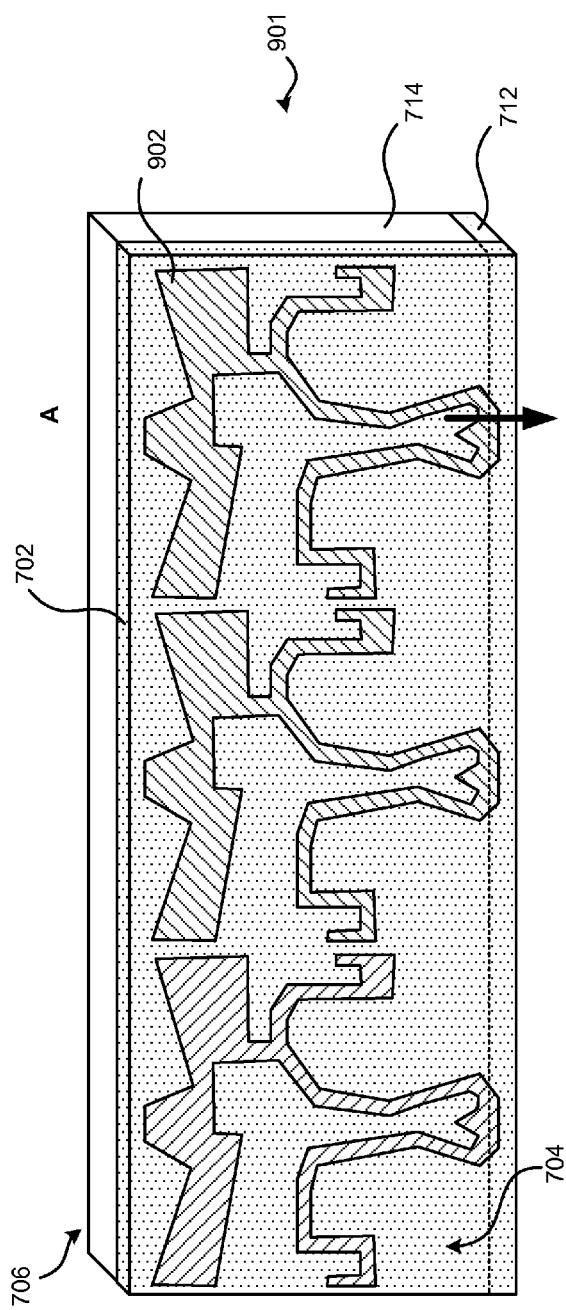
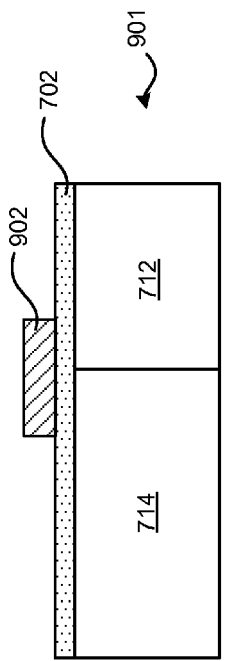
FIG. 9A
FIG. 9B

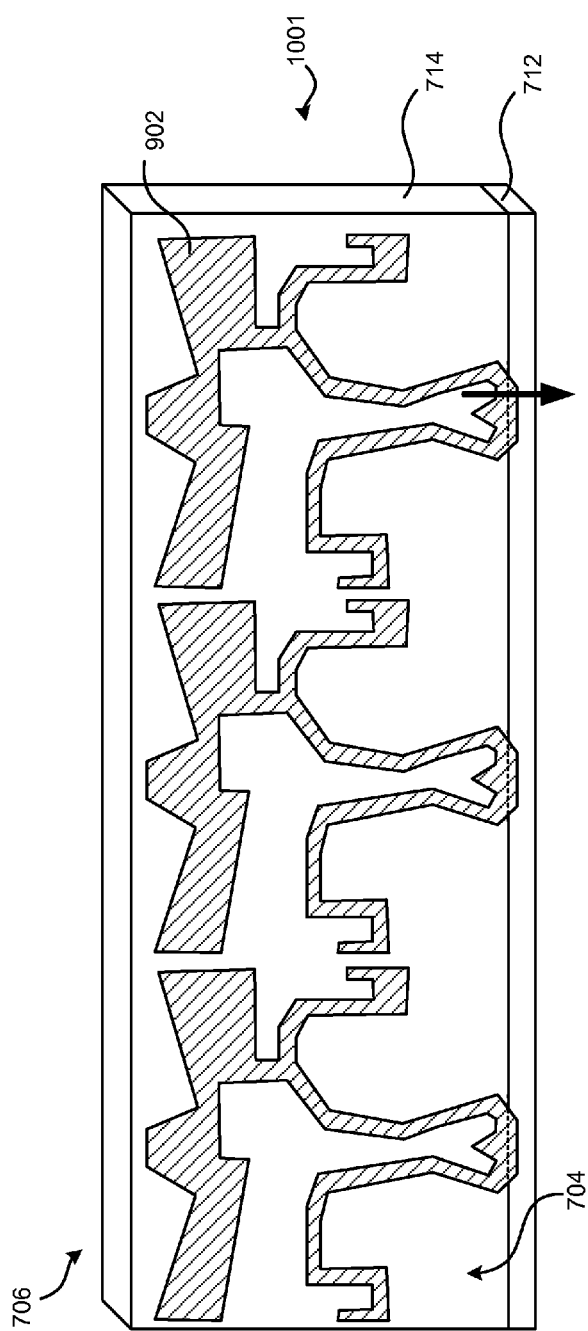
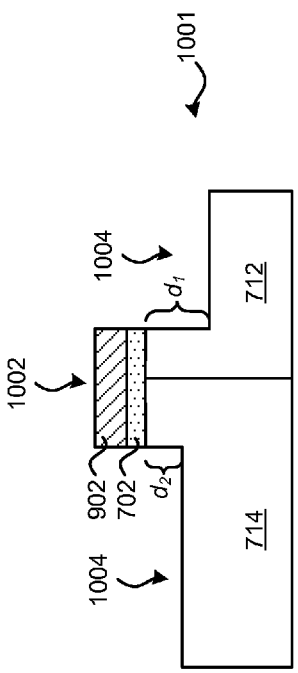
FIG. 10A
FIG. 10B

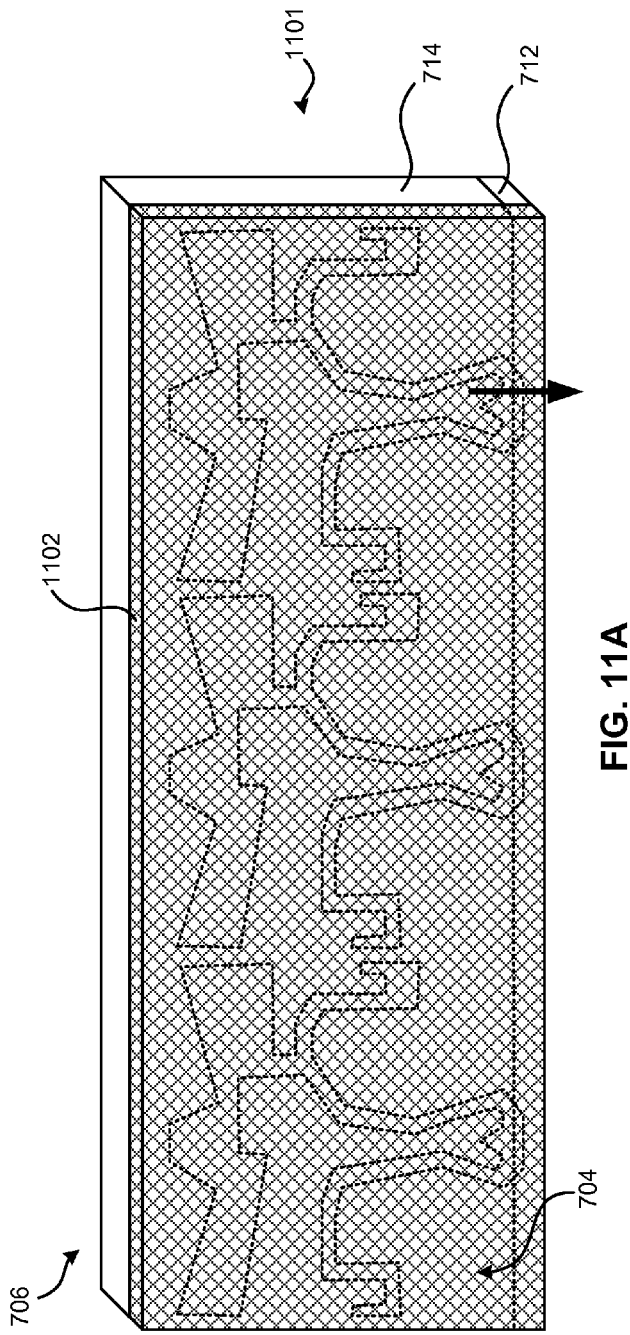
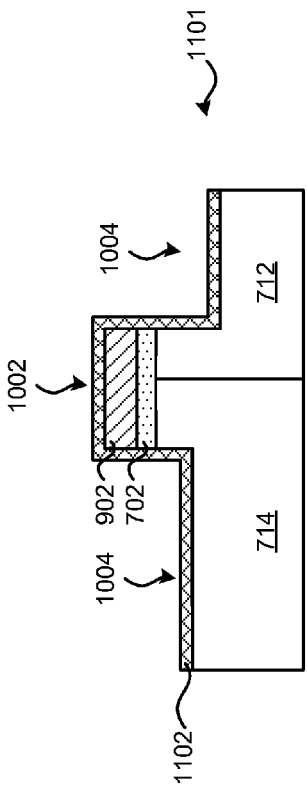
FIG. 11A
FIG. 11B

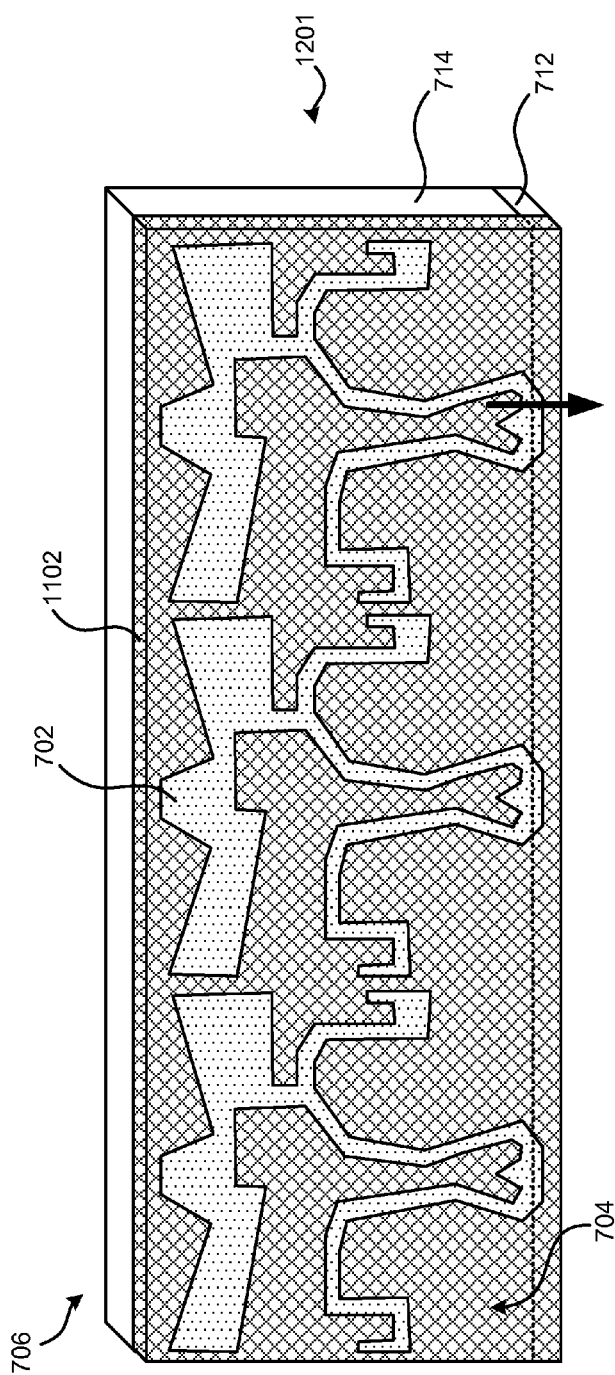
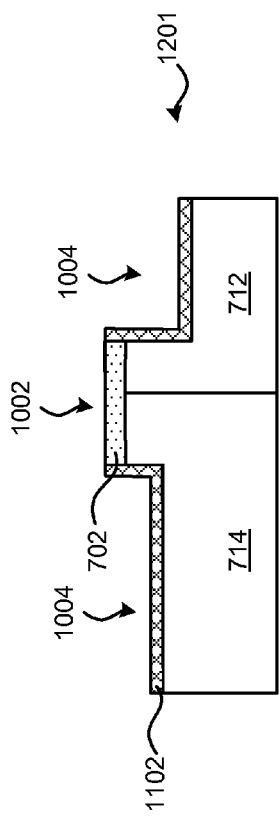
FIG. 12A
FIG. 12B

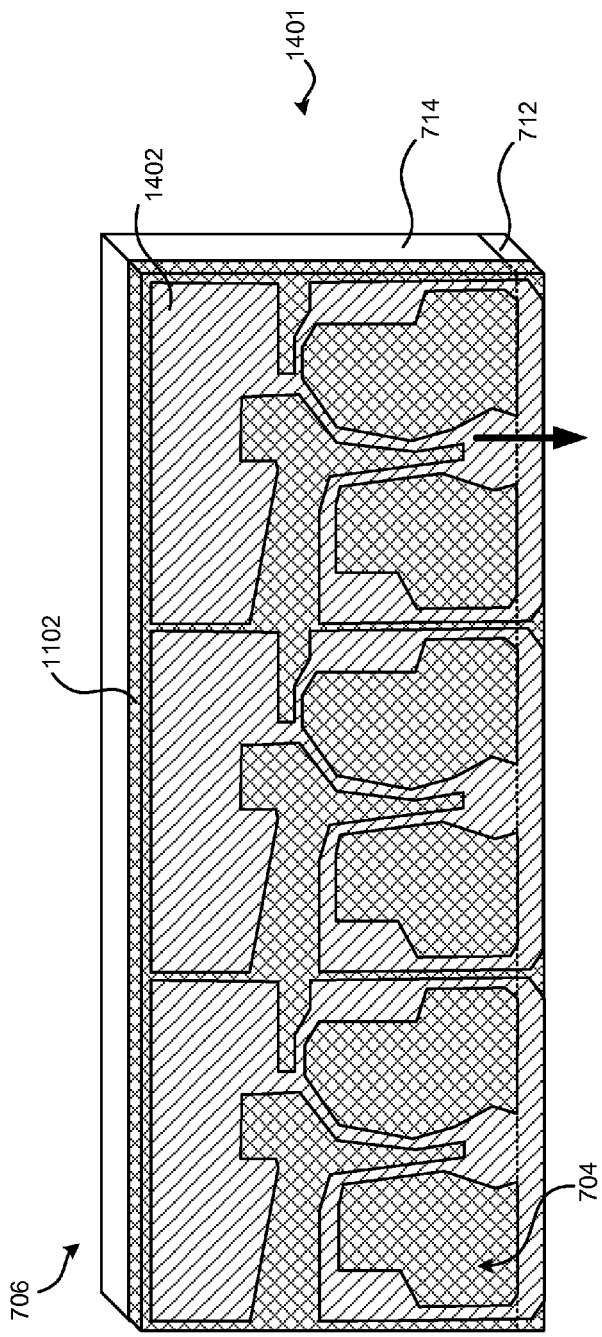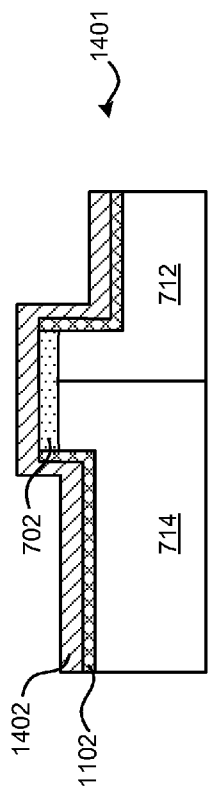
FIG. 14A
FIG. 14B

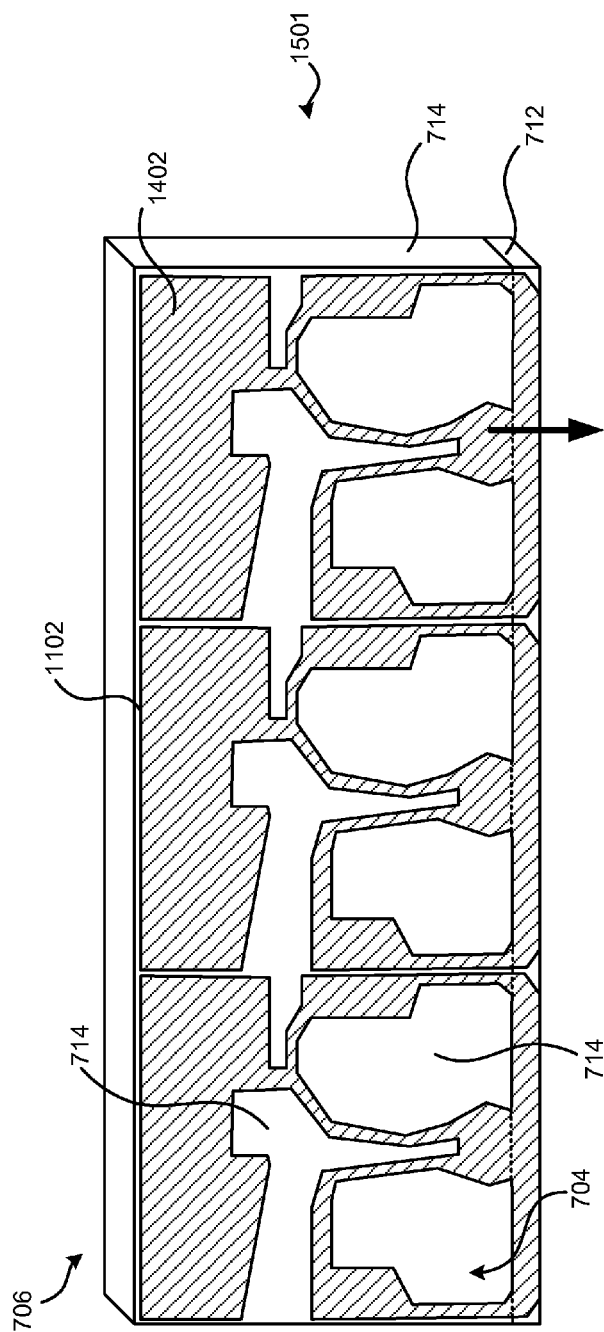
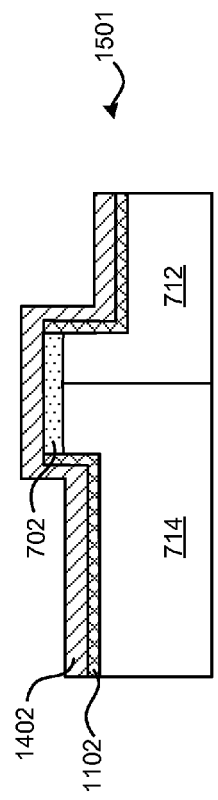
FIG. 15A
FIG. 15B

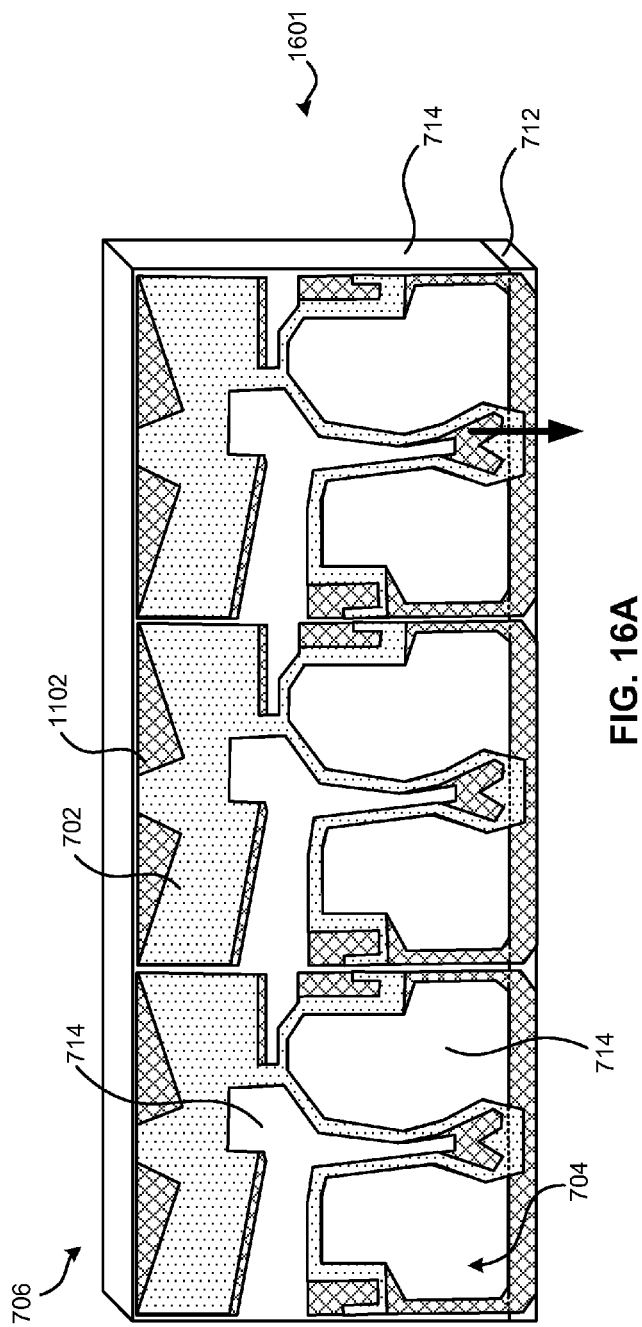
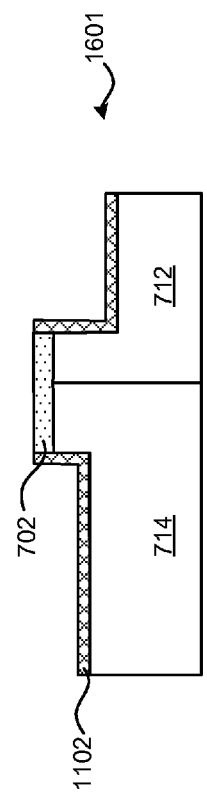
FIG. 16A
FIG. 16B

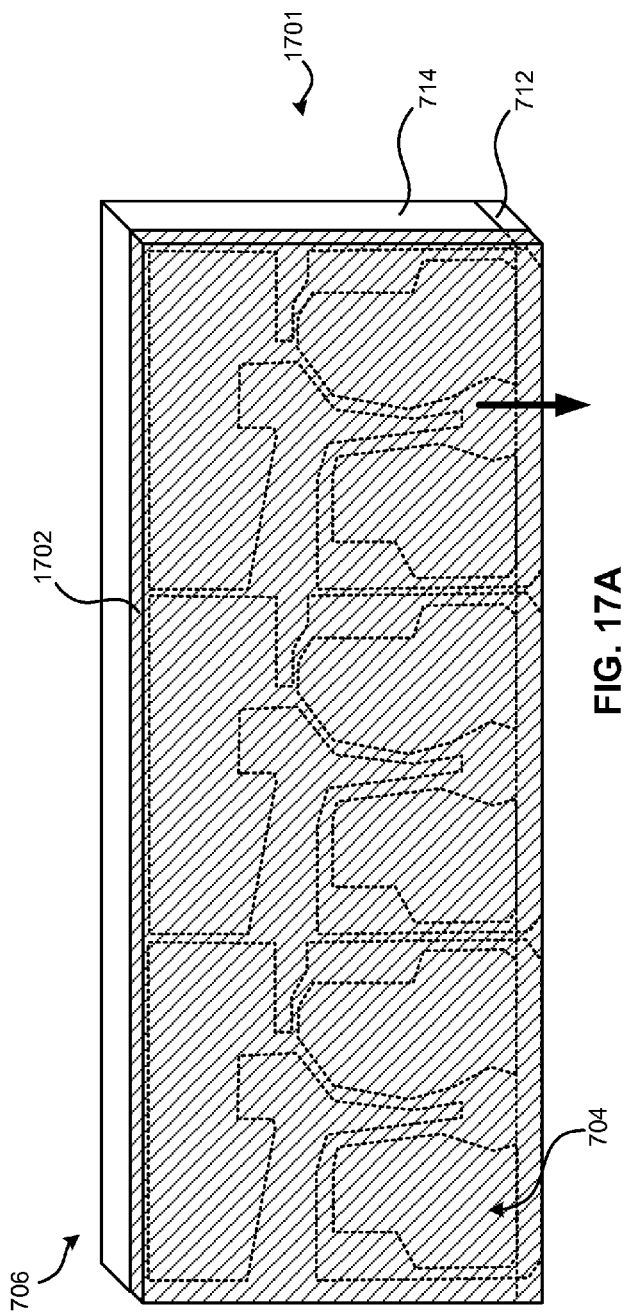
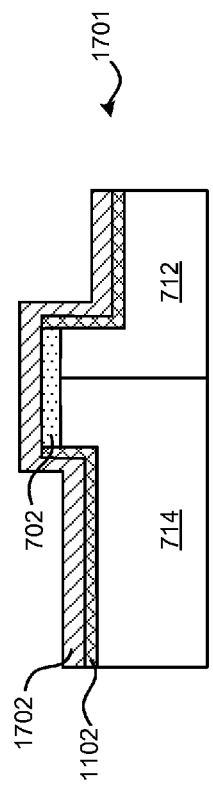
FIG. 17A
FIG. 17B

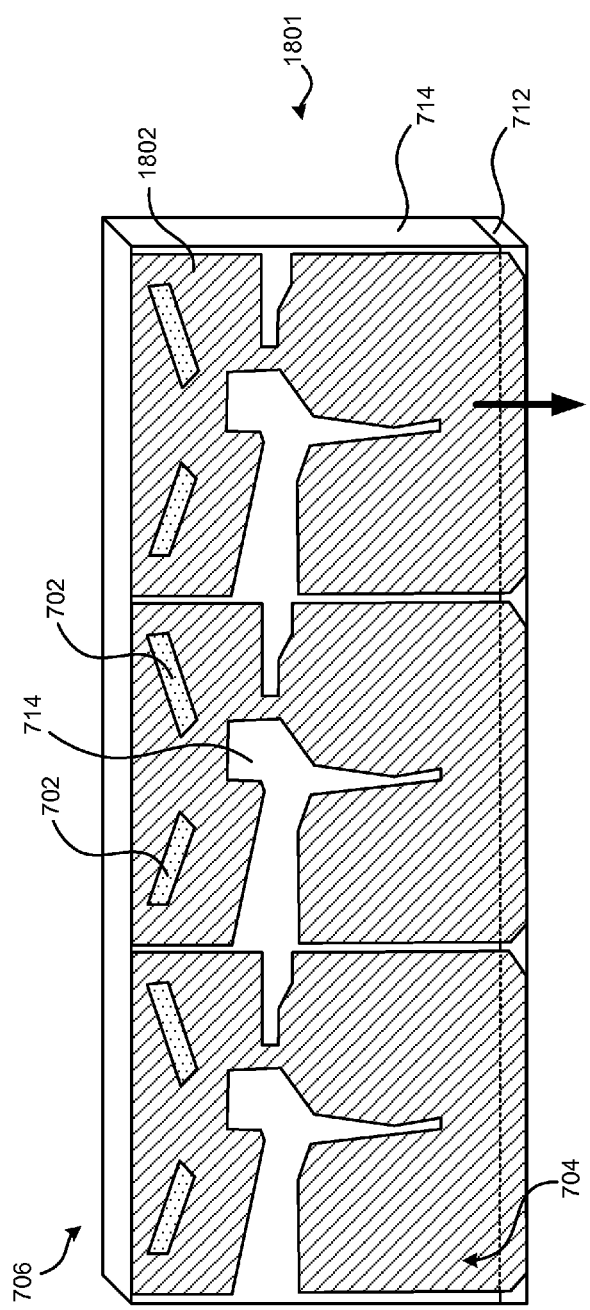
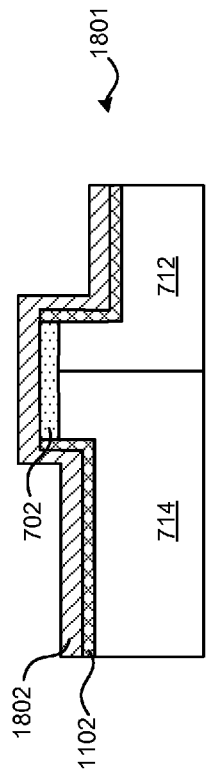
FIG. 18A
FIG. 18B

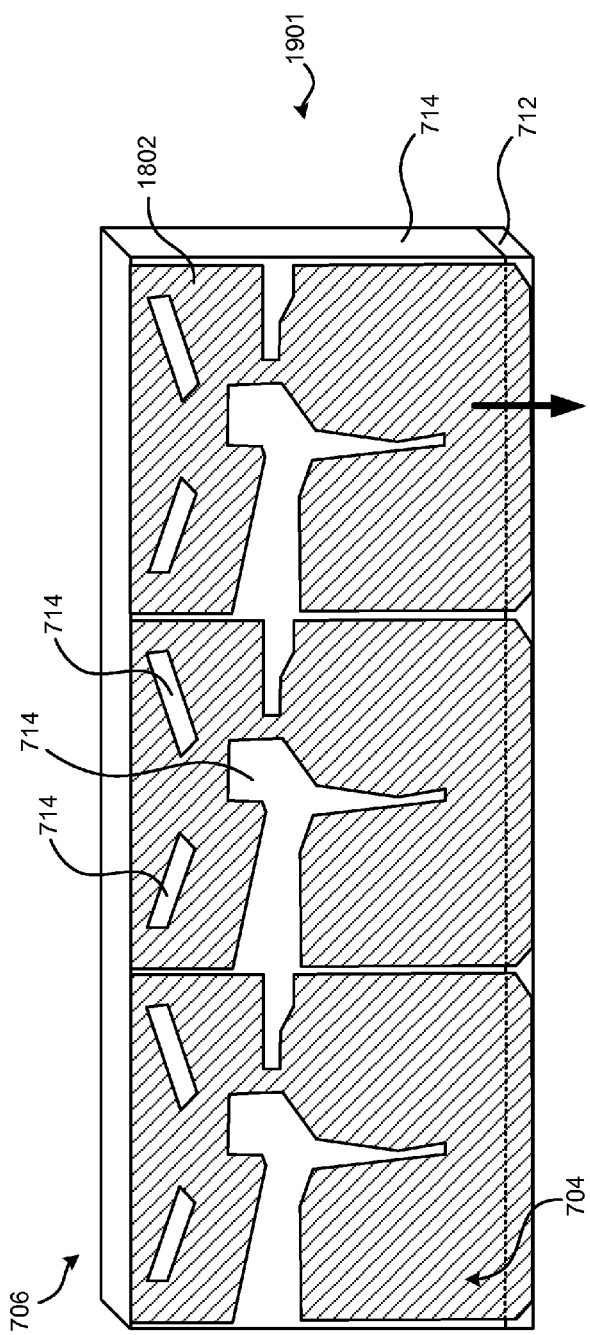
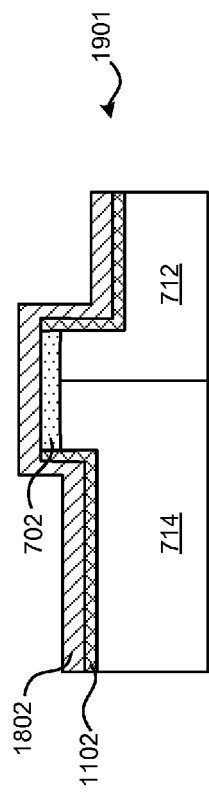
FIG. 19A
FIG. 19B

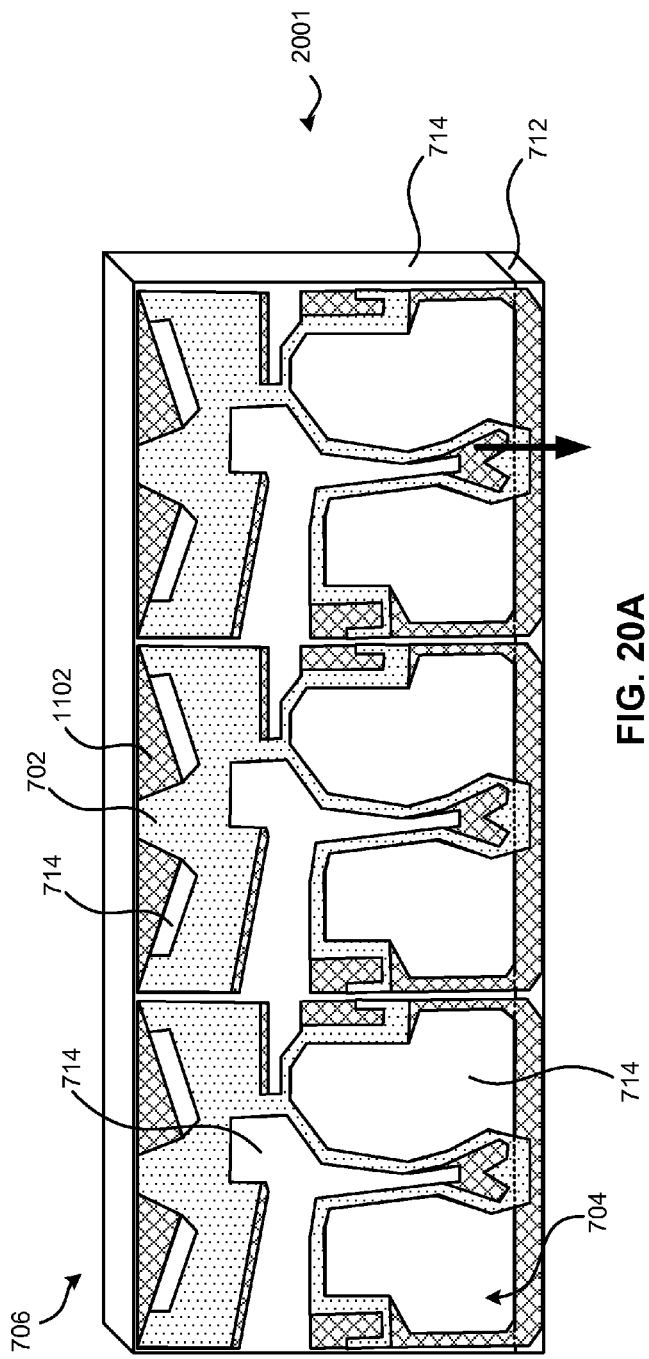
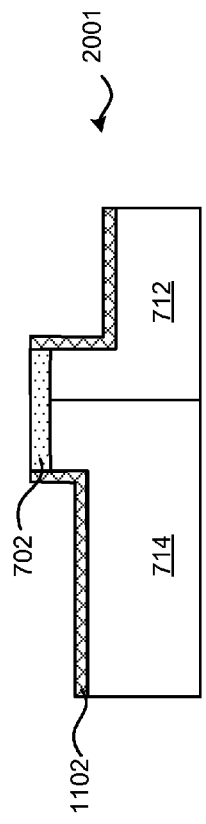
FIG. 20A
FIG. 20B

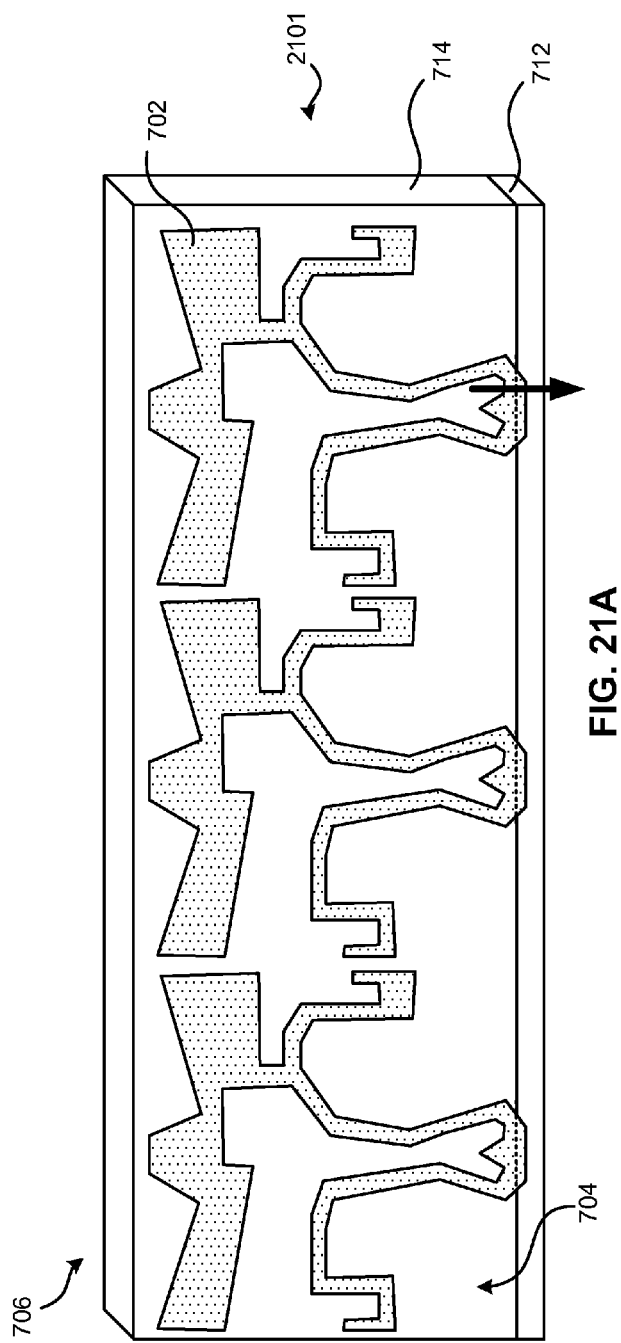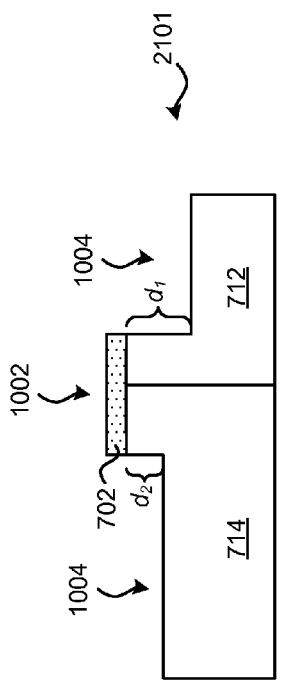
FIG. 21A
FIG. 21B

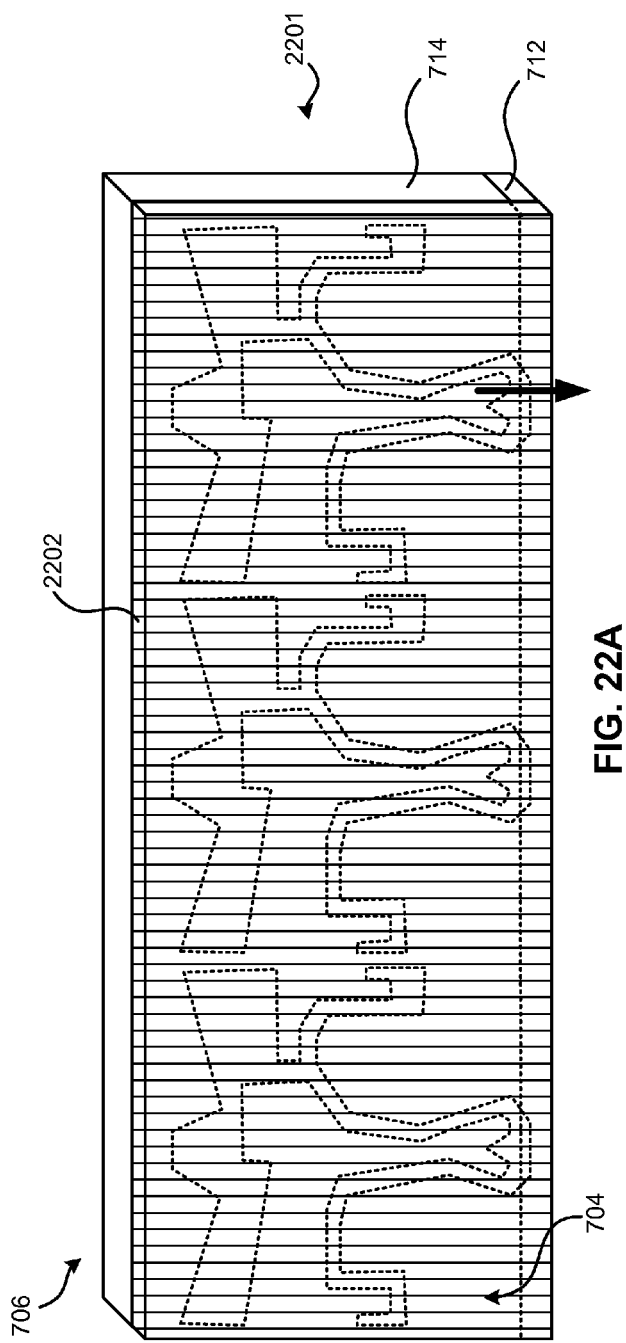
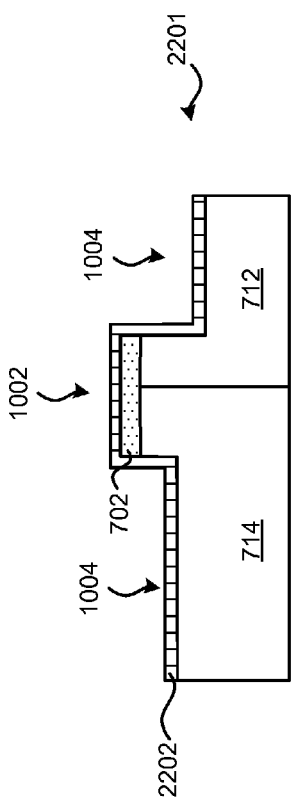
FIG. 22A
FIG. 22B

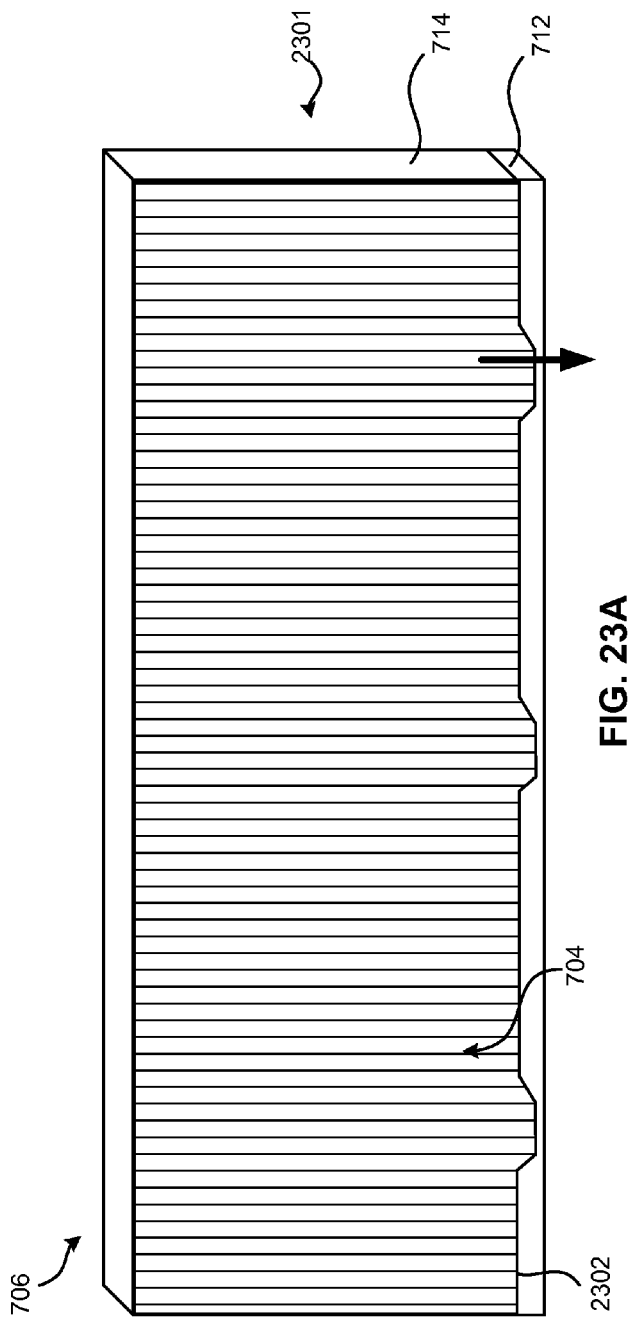
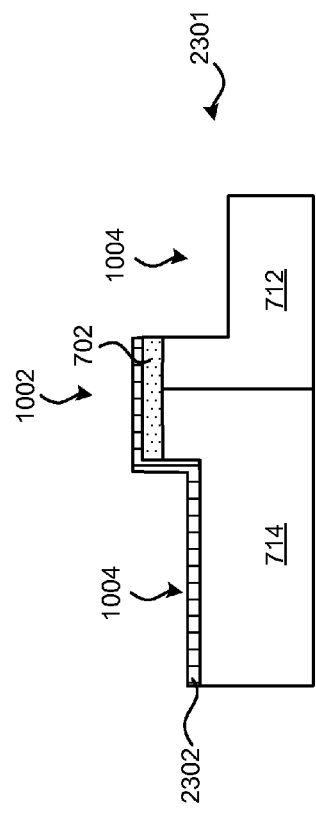
FIG. 23A
FIG. 23B

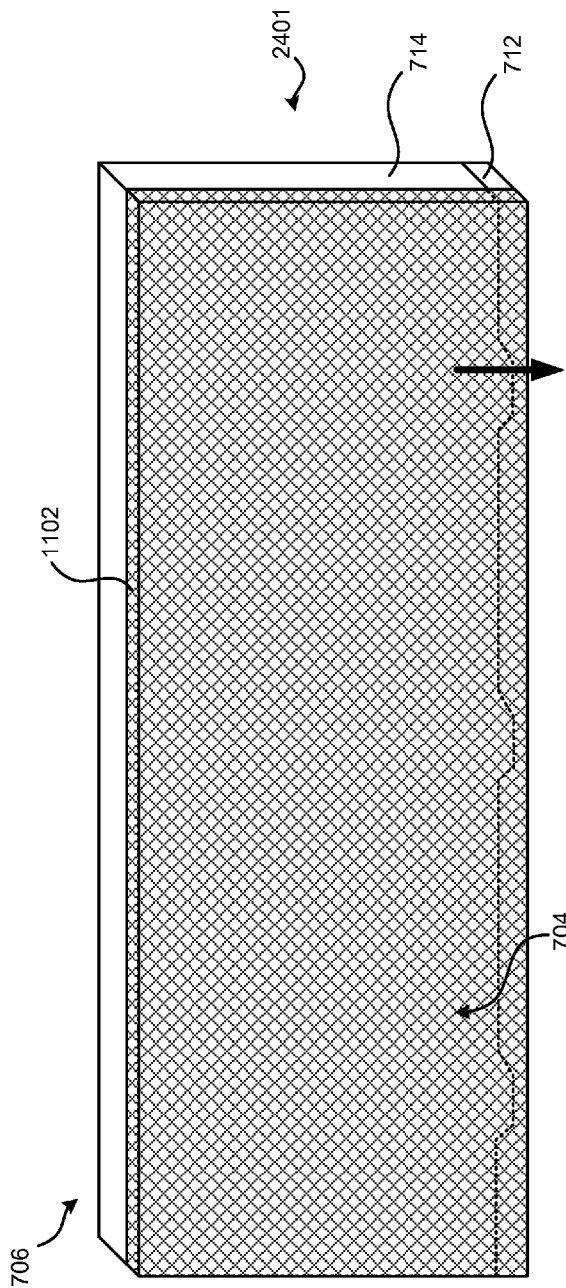
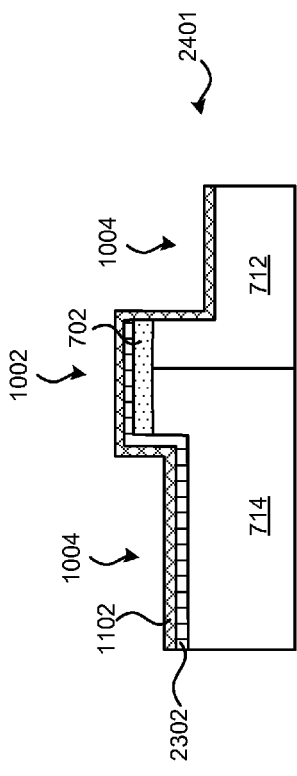
FIG. 24A
FIG. 24B

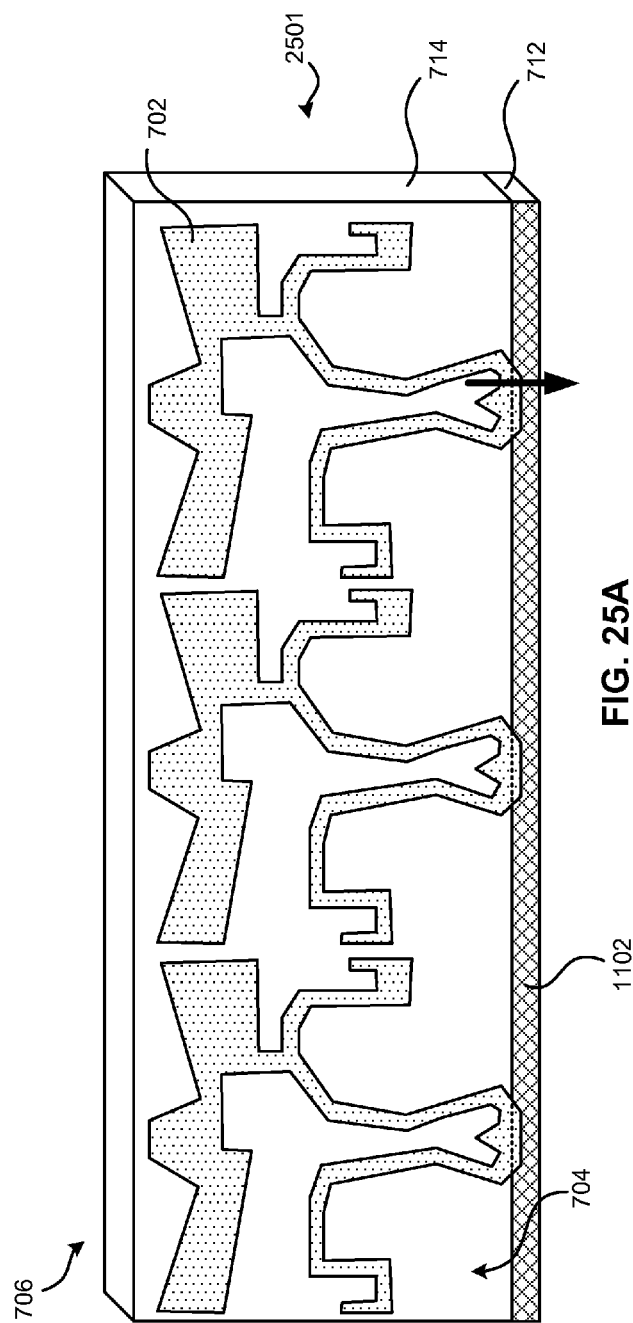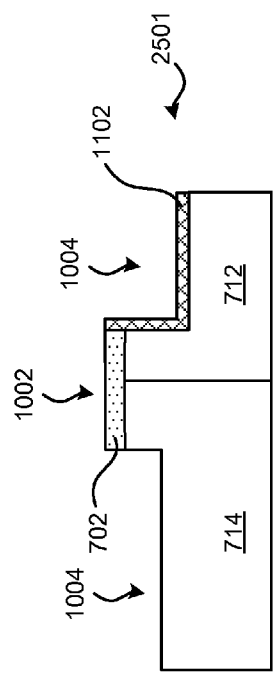
FIG. 25A
FIG. 25B

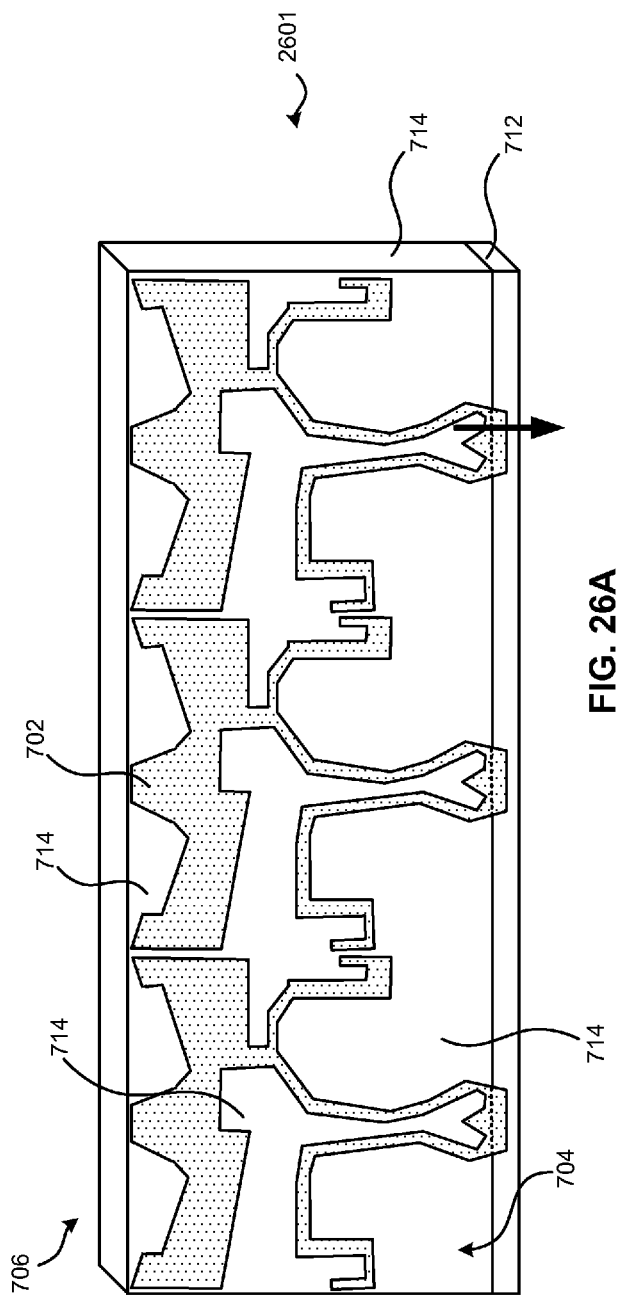
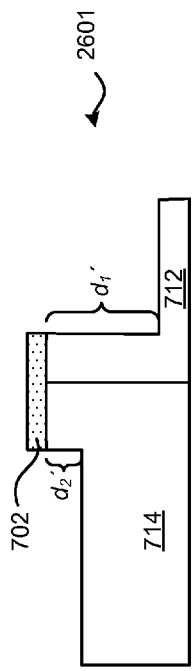
FIG. 26A
FIG. 26B

|  |  | Structure A: No secondary protective film applied after 1st etch | | | Structure B: No secondary protective film applied after 1st etch | | | Structure C: Secondary protective film applied after 1st etch | | | Structure D: No secondary protective film applied after 1st etch | | | Structure E: No secondary protective film applied after 1st etch | | |
|---|---|---|---|---|---|---|---|---|---|---|---|---|---|---|---|---|
|  |  | N | Mean | 3s | N | Mean | 3s | N | Mean | 3s | N | Mean | 3s | N | Mean | 3s |
| 1st Etch Cycle | After resist removal | 40 | 1.86 | 0.53 | 60 | 1.80 | 0.24 | 60 | 1.69 | 0.06 | 30 | 1.69 | 0.18 | 30 | 1.71 | 0.14 |
| 2nd Etch Cycle | 1st photo rework | 57 | 7.78 | 0.25 |  |  |  |  |  |  | 30 | 1.72 | 0.18 |  |  |  |
|  | 2nd photo rework | 57 | 7.78 | 0.10 |  |  |  |  |  |  | 30 | 1.74 | 0.15 |  |  |  |
|  | 3rd photo rework | 57 | 7.73 | 0.07 |  |  |  |  |  |  | 30 | 1.76 | 0.18 |  |  |  |
|  | After resist removal | 60 | 1.73 | 0.06 | 60 | 1.71 | 0.05 | 60 | 1.70 | 0.05 | 30 | 1.74 | 0.17 |  |  |  |
|  | 1st photo rework | 30 | 1.78 | 0.13 |  |  |  | 60 | 1.72 | 0.15 | 30 | 1.72 | 0.19 |  |  |  |
|  | 2nd photo rework | 30 | 1.75 | 0.11 |  |  |  | 30 | 1.76 | 0.10 | 30 | 1.74 | 0.21 |  |  |  |
|  | 3rd photo rework | 30 | 1.76 | 0.08 |  |  |  | 30 | 1.69 | 0.09 |  |  |  |  |  |  |
| 3rd Etch Cycle | After trillenium | 30 | 1.75 | 0.13 | 30 | 1.76 | 0.23 | 30 | 1.74 | 0.13 |  |  |  | 30 | 1.75 | 0.15 |
|  | After 3min P6G | 30 | 2.00 | 0.12 | 30 | 2.02 | 0.20 | 30 | 1.75 | 0.18 |  |  |  | 30 | 2.00 | 0.12 |
|  | After 3min P6G rework | 30 | 2.28 | 0.12 | 30 | 2.97 | 0.24 | 30 | 1.75 | 0.18 |  |  |  | 30 | 2.41 | 0.25 |
|  | After 3min P6G rework (2) |  |  |  |  |  |  | 30 | 1.73 | 0.12 |  |  |  |  |  |  |

FIG. 28A

THIN FILM CONFIGURED TO PRESERVE ALUMINA HEIGHT IN A MAGNETIC RECORDING HEAD AND METHODS OF MAKING THE SAME

FIELD OF THE INVENTION

The present invention relates to data storage systems, and more particularly, this invention relates to a magnetic recording head comprising a thin film configured to preserve alumna height therein, and methods of making the same.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to meet this desire is to increase the capacity by increasing the recording density of the HDD. To achieve higher recording density, further miniaturization of recording bits is effective, which in turn typically requires the design of smaller and smaller components. The further miniaturization of the various components, however, presents its own set of challenges and obstacles.

Narrowing the magnetic spacing is one effective method for improving the recording density of a magnetic recording device, such as a HDD. The magnetic spacing corresponds to the gap between the lowest point (farthest protruding portion at the ABS) of the magnetic head and the uppermost surface of the magnetic medium. Reducing the magnetic spacing allows the read/write elements of the magnetic head to better distinguish between the magnetic fields emanating from closely spaced regions on the magnetic medium (e.g., the magnetic disk).

A narrow magnetic spacing may be achieved with a low slider fly height, i.e., flying the slider as close to the magnetic medium as possible while avoiding contact therewith. However, with the push to decrease slider fly height, variations in said height may become increasingly problematic due to head/media intermittent contact, which may reduce reading/writing quality, result in a head crash and loss of data, etc. Accordingly, while a low slider fly height may be desirable to improve the performance of a magnetic recording device, such as a HDD, a constant slider fly height may also be desirable to ensure the consistency of said performance.

The materials and/of processes used in manufacturing a slider may affect the fly height thereof. Current manufacturing techniques often result in an undesired variation in fly height from slider to slider, leading to inconsistent reading/writing performance.

SUMMARY

According to one embodiment, a magnetic head slider includes: a leading edge, and a trailing edge; a media facing side (MFS) extending between the leading edge and the trailing edge; a first region located near the trailing edge, and a second region located between the first region and the leading edge; a center rail comprising: a forward segment protruding from the first region of the slider, and a posterior segment protruding from the second region of the slider; a rear rail protruding from the second region of the slider; and a secondary protective film deposited on one or more portions of the first region.

According to another embodiment, a method includes: depositing a primary overcoat on a media facing side (MFS) of a magnetic head slider, the magnetic head slider comprising: a leading edge, a trailing edge, a first region located near the trailing edge, a second region extending between the first region and the leading edge; performing a first subtractive process to form one or more rails in the MFS of the magnetic head slider; and depositing a secondary protective coat on at least one portion of the first region to preserve a thickness thereof, the thickness being measured in a direction normal to the MFS of the magnetic head slider.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a schematic representation of a perpendicular recording medium, according to one embodiment.

FIG. 5A is a schematic representation of a recording head and the perpendicular recording medium of FIG. 4, according to one embodiment.

FIG. 5B is a schematic representation of a recording apparatus configured to record separately on both sides of a perpendicular recording medium, according to one embodiment.

FIGS. 21(A,B)-25(A,B) provide various views of a rowbar including a plurality of sliders thereon in various intermediate states of manufacture, according to another embodiment.

FIGS. 26(A,B) provide various views of a rowbar including a plurality of sliders thereon towards a final state of manufacture, according to yet another embodiment.

FIG. 28A is a table comparing ratios of alumina to $Al_2O_3$—TiC etch depths for various rowbars, which either include or do not include a secondary protective film as described herein, according to various embodiments.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Further, as used herein in various approaches, the term "primarily" refers to at least greater than 80%, at least greater than 85%, at least greater than 90%, at least greater than 95%, or, preferably, greater than 99% of the stated condition, composition, property, and/or effect.

The following description discloses several preferred embodiments of disk-based storage systems and/or related systems and methods, as well as operation and/or component parts thereof.

In one general embodiment, a magnetic head slider includes: a leading edge, and a trailing edge; a media facing side (MFS) extending between the leading edge and the trailing edge; a first region located near the trailing edge, and a second region located between the first region and the leading edge; a center rail comprising: a forward segment protruding from the first region of the slider in a direction normal to the MFS of the magnetic head slider, and a posterior segment protruding from the second region of the slider in the direction normal to the MFS of the magnetic head slider; a rear rail protruding from the second region of the slider in the direction normal to the MFS of the magnetic head slider; and a secondary protective film deposited on one or more portions of the first region.

In another general embodiment, a method includes: depositing a primary overcoat on a media facing side (MFS) of a magnetic head slider, the magnetic head slider comprising: a leading edge, a trailing edge, a first region located near the trailing edge, a second region extending between the first region and the leading edge; performing a first subtractive process to form one or more rails in the MFS of the magnetic head slider; and depositing a secondary protective coat on at least one portion of the first region to preserve a thickness thereof, the thickness being measured in a direction normal to the MFS of the magnetic head slider.

Figure 1:
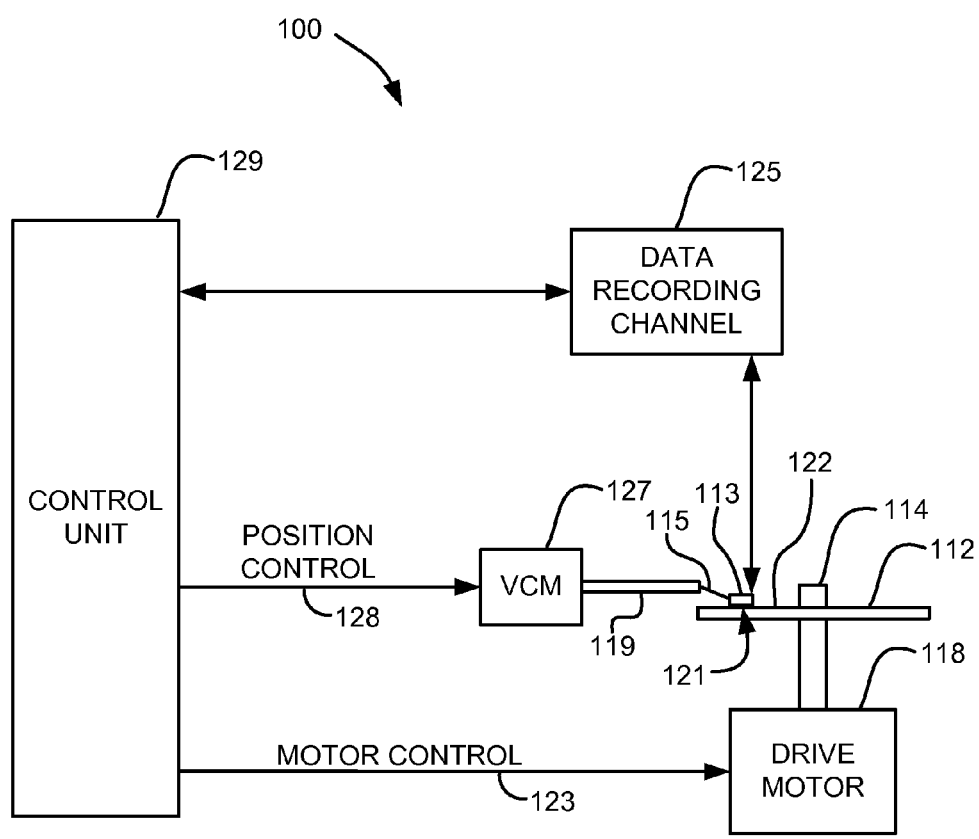
FIG. 1 is a simplified drawing of a magnetic recording disk drive system, according to one embodiment.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Regarding a magnetic head, an inductive write portion therein includes a coil layer embedded in one or more insulation layers (insulation stack), the insulation stack being located between first and second pole piece layers. A gap may be formed between the first and second pole piece layers by a gap layer at an air bearing surface (ABS) of the write portion. The pole piece layers may be connected at a back gap. Currents are conducted through the coil layer, which produces magnetic fields in the pole pieces. The magnetic fields fringe across the gap at the ABS for the purpose of writing bits of magnetic field information in tracks on moving media, such as in tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
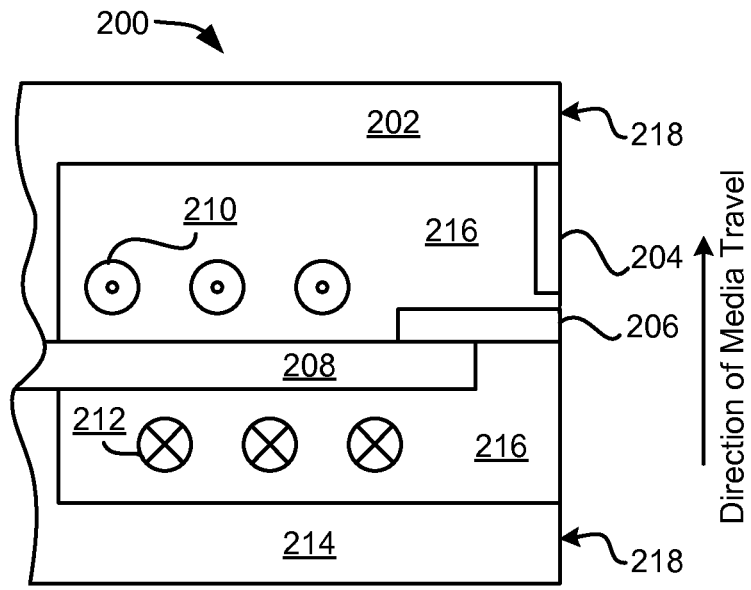
FIG. 2A is a cross-sectional view of a perpendicular magnetic head with helical coils, according to one embodiment.

FIG. 2A is a cross-sectional view of a perpendicular magnetic head 200, according to one embodiment. In FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

Figure 2B:
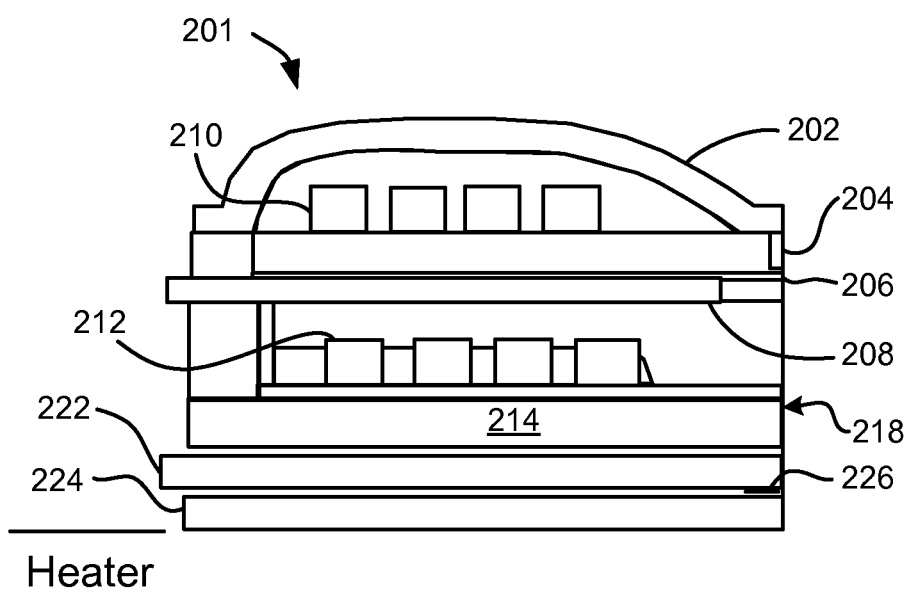
FIG. 2B is a cross-sectional view a piggyback magnetic head with helical coils, according to one embodiment.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

Figure 3A:
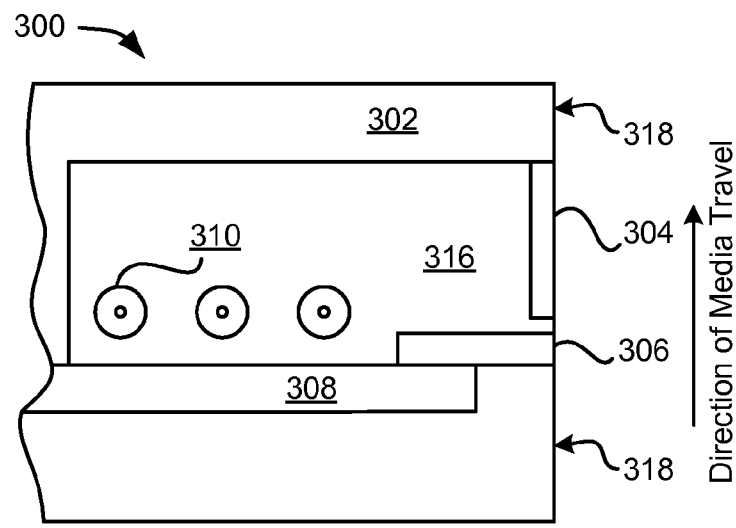
FIG. 3A is a cross-sectional view of a perpendicular magnetic head with looped coils, according to one embodiment.

FIG. 3A is a schematic diagram of another embodiment of a perpendicular magnetic head 300, which uses looped coils 310 to provide flux to the stitch pole 308, a configuration that is sometimes referred to as a pancake configuration. The stitch pole 308 provides the flux to the main pole 306. With this arrangement, the lower return pole may be optional. Insulation 316 surrounds the coils 310, and may provide support for the stitch pole 308 and main pole 306. The stitch pole may be recessed from the ABS 318. The direction of the media travel, as indicated by the arrow to the right of the structure, moves the media past the stitch pole 308, main pole 306, trailing shield 304 which may be connected to the wrap around shield (not shown), and finally past the upper return pole 302 (all of which may or may not have a portion in contact with the ABS 318). The ABS 318 is indicated across the right side of the structure. The trailing shield 304 may be in contact with the main pole 306 in some embodiments.

Figure 3B:
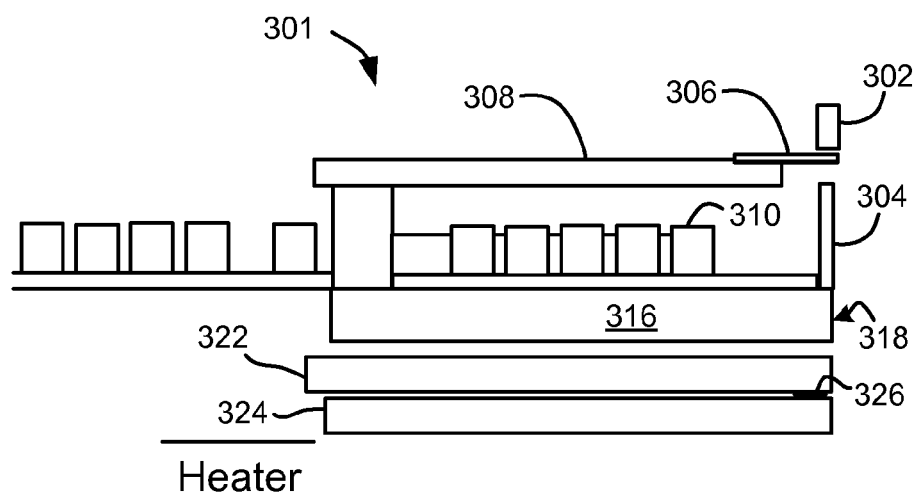
FIG. 3B is a cross-sectional view of a piggyback magnetic head with looped coils, according to one embodiment.

FIG. 3B illustrates another embodiment of a piggyback magnetic head 301 having similar features to the head 300 of FIG. 3A. As shown in FIG. 3B, the piggyback magnetic head 301 also includes a looped coil 310, which wraps around to form a pancake coil. Sensor shields 322, 324 are additionally shown. The sensor 326 is typically positioned between the sensor shields 322, 324.

In FIGS. 2B and 3B, an optional heater is shown near the non-ABS side of the magnetic head. A heater (Heater) may also be included in the magnetic heads shown in FIGS. 2A and 3A. The position of this heater may vary based on design parameters such as where the protrusion is desired, coefficients of thermal expansion of the surrounding layers, etc.

FIG. 4 provides a schematic diagram of a simplified perpendicular recording medium 400, which may also be used with magnetic disk recording systems, such as that shown in FIG. 1. As shown in FIG. 4, the perpendicular recording medium 400, which may be a recording disk in various approaches, comprises at least a supporting substrate 402 of a suitable non-magnetic material (e.g., glass, aluminum, etc.), and a soft magnetic underlayer 404 of a material having a high magnetic permeability positioned above the substrate 402. The perpendicular recording medium 400 also includes a magnetic recording layer 406 positioned above the soft magnetic underlayer 404, where the magnetic recording layer 406 preferably has a high coercivity relative to the soft magnetic underlayer 404. There may one or more additional layers (not shown), such as an "exchange-break" layer or "interlayer", between the soft magnetic underlayer 404 and the magnetic recording layer 406.

The orientation of magnetic impulses in the magnetic recording layer 406 is substantially perpendicular to the surface of the recording layer. The magnetization of the soft magnetic underlayer 404 is oriented in (or parallel to) the plane of the soft magnetic underlayer 404. As particularly shown in FIG. 4, the in-plane magnetization of the soft magnetic underlayer 404 may be represented by an arrow extending into the paper.

FIG. 5A illustrates the operative relationship between a perpendicular head 508 and the perpendicular recording medium 400 of FIG. 4. As shown in FIG. 5A, the magnetic flux 510, which extends between the main pole 512 and return pole 514 of the perpendicular head 508, loops into and out of the magnetic recording layer 406 and soft magnetic underlayer 404. The soft magnetic underlayer 404 helps focus the magnetic flux 510 from the perpendicular head 508 into the magnetic recording layer 406 in a direction generally perpendicular to the surface of the magnetic medium. Accordingly, the intense magnetic field generated between the perpendicular head 508 and the soft magnetic underlayer 404, enables information to be recorded in the magnetic recording layer 406. The magnetic flux is further channeled by the soft magnetic underlayer 404 back to the return pole 514 of the head 508.

As noted above, the magnetization of the soft magnetic underlayer 404 is oriented in (parallel to) the plane of the soft magnetic underlayer 404, and may represented by an arrow extending into the paper. However, as shown in FIG. 5A, this in plane magnetization of the soft magnetic underlayer 404 may rotate in regions that are exposed to the magnetic flux 510.

FIG. 5B illustrates one embodiment of the structure shown in FIG. 5A, where soft magnetic underlayers 404 and magnetic recording layers 406 are positioned on opposite sides of the substrate 402, along with suitable recording heads 508 positioned adjacent the outer surface of the magnetic recording layers 406, thereby allowing recording on each side of the medium.

Except as otherwise described herein with reference to the various inventive embodiments, the various components of the structures of FIGS. 1-5B, and of other embodiments disclosed herein, may be of conventional material(s), design, and/or fabricated using conventional techniques, as would become apparent to one skilled in the art upon reading the present disclosure.

Figure 6:
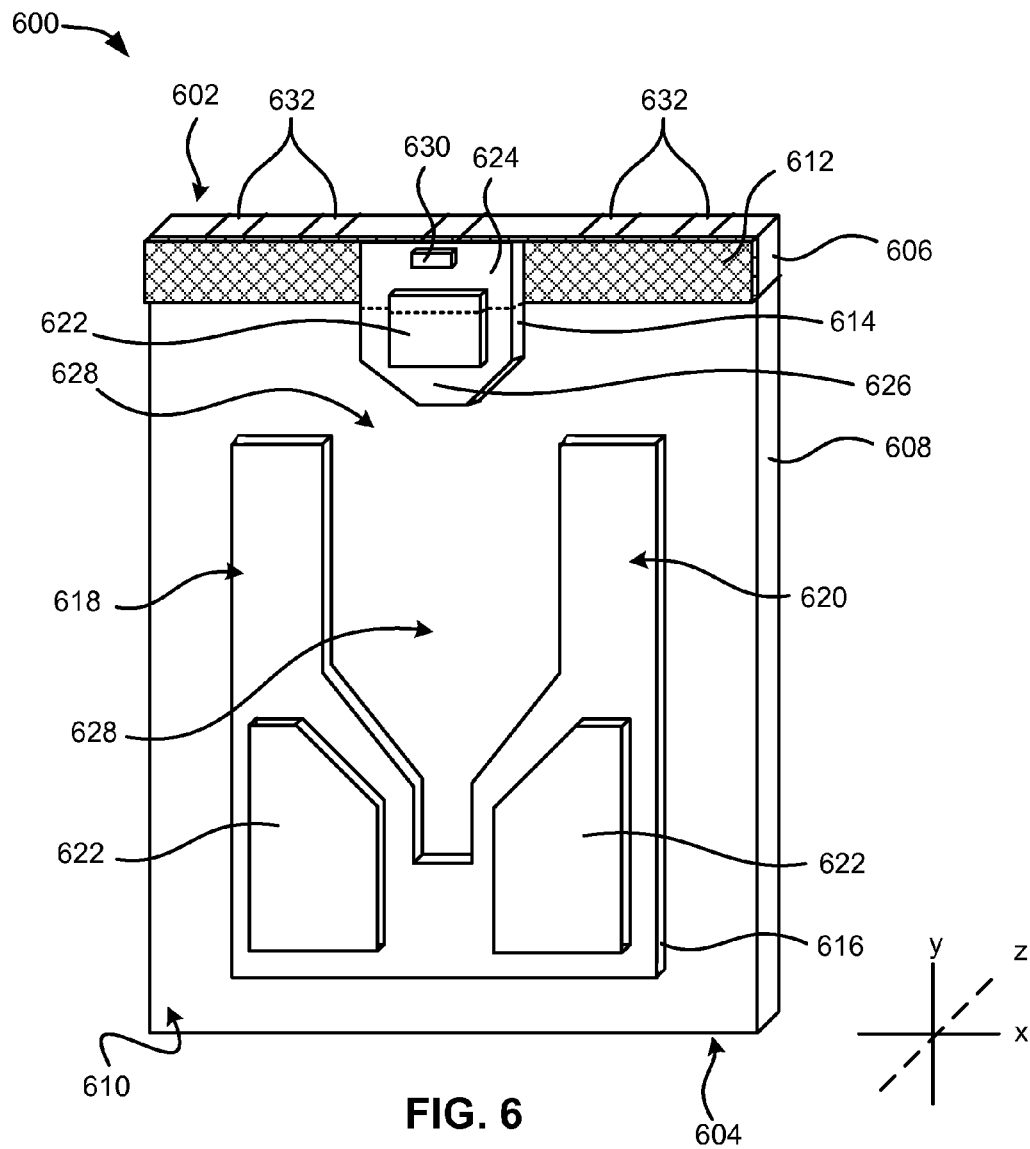
FIG. 6 is a media facing side (MFS) view of a slider, according to one embodiment.

Referring now to FIG. 6, a media facing side (MFS) view of a slider 600 is shown, according to one embodiment. As an option, the slider 600 may be implemented in conjunction with features from any other embodiment listed herein, such as those described with reference to the other FIGS. Of course, the slider 600 and others presented herein may be used in various applications and/or in permutations, which may or may not be specifically described in the illustrative embodiments listed herein. For instance, the slider 600 may include more or less components than those shown in FIG. 6, in various approaches. Moreover, unless otherwise specified, one or more components of the slider 600 may be of conventional material(s), design, and/or fabricated using conventional techniques, as would become apparent to one skilled in the art upon reading the present disclosure. Further, the slider 600 and others presented herein may be used in any desired environment.

As shown in FIG. 6, the slider 600 has a trailing edge 602, and a leading edge 604. The slider also includes a first region 606 near the trailing edge 602, and a second region 608 extending between the first region 606 and the leading edge 604. The slider 600 additionally includes a media facing side (MFS) 610 extending between the trailing and leading edges 602, 604, and which faces a magnetic medium (not shown in FIG. 6).

In various approaches, the first region 606 and the second region 608 of the slider 600 may each include a ceramic material. In some approaches, the first and second regions 606, 608 may include different materials. In more approaches, the first region 606 may have an etch rate in an etchant and/or chemical solution that is different than the etch rate of the second region 608 in the same etchant and/or chemical solution. Exemplary chemical solutions may include, but are not limited to: ethanol; deionized water; propylene-glycol-mono-methylether-acetate (PGMEA); 1-methyl-2-pyrrolidon (NMP); propylene-glycol-mono-methyl ether (PGM); PMER Developer P-6G (tetramethyl ammonium hydroxide (2.5%), surfactant (2%), water (95.5%)); Semi Clean EP-11D (glycolic solvent (50-70%), 2-aminoethanol (19.5%), surfactant, etc.). In particular approaches, the first region 606 may include primarily $Al_2O_3$, and the second region 608 may include primarily $Al_2O_3$—TiC.

In preferred approaches, a secondary protective film 612 may be deposited on one or more portions of the media facing side of the first region 606. The secondary protective film 612 may be configured to withstand etching and/or chemical lift-off processes, and thus preserve the thickness of the first region 606 (in the z direction), as described in detail later. In particular approaches, the secondary protective film 612 may include one or more of: Si, SiC, SiN, carbon, and other such suitable materials as would become apparent to one having skill in the art upon reading the present disclosure. In some approaches, the thickness of the secondary protective film 612 (in the z direction of FIG. 6) may be in a range from about 0.1 nm to about 2.0 nm, preferably in a range from about 0.3 nm to about 1.0 nm.

As also shown in FIG. 6, the slider 600 includes a center rail 614 and a rear rail 616. The center rail 614 is located near the trailing edge 602, and spans both the first and second regions 606, 608 of the slider 600. The rear rail 616 is located in the second region 608 of the slider 600, and between the center rail 614 and the leading edge 604. The rear rail 616 may comprise side rails 618, 620, which may or may not be physically connected to each other. One or more landing pads 622 may be located on the media facing side of the center and rear rails 614, 616.

The center rail 614 preferably comprises a forward segment 624 and a posterior segment 626, where the forward segment protrudes from the first region 606 in a direction normal to the MFS 610 of the slider 600, and the posterior segment 626 protrudes from the second region 608 in a direction normal to the MFS 610 of the slider 600. As also shown in FIG. 6, the rear rail 616 protrudes from the second region 608 in a direction normal to the MFS 610 of the slider 600.

As the center and rear rails 614, 616 protrude from the slider 600 in a direction normal to the MFS thereof, the areas 628 of the slider 600 located between the center rail 614 and the rear rail 616, between the side rails 618, 620, etc. may form one or more negative-pressure surfaces.

In some approaches, the uppermost surface (i.e., the surface closest to the magnetic medium) of the media facing side of the center rail 614 may lie substantially along a plane oriented parallel to the x-y plane of FIG. 6. In more approaches the uppermost surface of the media facing side of the rear rail 616 may lie substantially along a plane oriented parallel to the x-y plane of FIG. 6. In various approaches, one or more portions of the uppermost surface of the center rail 614 and one or more portions of the uppermost surface of the rear rail 616 may lie in substantially the same plane oriented parallel to the x-y plane of FIG. 6.

In additional approaches, the uppermost surface of the media facing side of at least one landing pad 622 may lie substantially along a plane oriented parallel to the x-y plane of FIG. 6. In further approaches, the uppermost surface of the media facing side of each landing pad 622 may lie in substantially the same plane oriented parallel to the x-y plane of FIG. 6.

In particular approaches, the center rail 614 (and/or the rear rail 616) may comprise one or more layers. In approaches where the center rail (and/or the rear rail 616) comprises two or more layers, at least one of the layers may partially, substantially or entirely overlap another of the layers. Additionally, in approaches where the center rail (and/or the rear rail 616) comprises two or more layers, each layer may have a different height relative to a direction normal to the MFS 610 of the slider 600.

In various approaches, the center rail 614 may comprise a ceramic material. In some approaches, one or more portions of the center rail 614 may comprise primarily $Al_2O_3$—TiC. In more approaches, one or more portions of the center rail 614 may comprise primarily $Al_2O_3$.

While not shown in FIG. 6, a thin primary overcoat (also referred to herein as a media facing side overcoat (MFSOC)), which may include but is not limited to diamond like carbon, may be deposited on one or more portions of the media facing side of the center rail 614, according to yet more approaches. While also not shown in FIG. 6, the secondary protective film 612 may be deposited on one or more portions of the media facing side of the center rail 614, according to still more approaches. In those approaches where the center rail 614 includes one or more portions having the MFSOC thereon, and one or more portions having the secondary protective film thereon, the portion(s) with the MFSOC may be raised higher, in direction normal to the MFS of the slider 600, than the portion(s) with the secondary protective film thereon.

In various approaches, the center rail 614 may include at least one of the following: one or more portions comprising primarily $Al_2O_3$—TiC coated with the MFSOC on at least the media facing side thereof; one or more portions comprising primarily $Al_2O_3$—TiC coated with a secondary protective film (e.g., including Si, SiC, SiN, carbon) on at least the media facing side thereof; one or more portions comprising primarily $Al_2O_3$ coated with the MFSOC on at least the media facing side thereof; and one or more portions comprising primarily $Al_2O_3$ coated a secondary protective film (e.g., including Si, SiC, SiN, carbon) on at least the media facing side thereof.

In one particular approach, the forward segment 624 of the center rail 614 may include primarily $Al_2O_3$ and the posterior segment 626 of the center rail 614 may include primarily $Al_2O_3$—TiC, where both the forward and posterior segments 624, 626 are coated with the MFSOC, and have a same height relative in a direction normal to the MFS 610 of the slider 600. In another particular approach, two portions of the center rail 614 that are located in the second region 608 of the slider 600 may each primarily include $Al_2O_3$—TiC, however one of the portions may be coated with the MFSOC and have a greater height (in a direction normal to the MFS 610 of the slider 600) than the other portion, which may be coated with the secondary protective film.

In various approaches, the rear rail 616 may include a ceramic material. In some approaches, one or more portions of the rear rail 616 may comprise primarily $Al_2O_3$—TiC. While not shown in FIG. 6, the MFSOC may be deposited on one or more portions of the media facing side of the rear rail 616 in some approaches. While also not shown in FIG. 6, the secondary protective film 612 may be deposited on one or more portions of the media facing side of the rear rail 616 in additional approaches. In those approaches where the rear rail 616 includes one or more portions having the MFSOC thereon, and one or more portions having the secondary protective film thereon, the portion(s) with the MFSOC may be raised higher (in a direction normal to the MFS 610 of the slider 600) than the portion(s) with the secondary protective film thereon.

In further approaches, the rear rail 616 may include at least one of the following: one or more portions comprising primarily $Al_2O_3$—TiC coated with the MFSOC on at least the media facing side thereof; and one or more portions comprising primarily $Al_2O_3$—TiC coated with the secondary protective film on at least the media facing side thereof.

As further shown in FIG. 6, the slider 600 also includes a magnetic head assembly 630 located at or near the trailing edge 604. The magnetic head assembly 630 includes read and write heads, such as those depicted in FIGS. 2A/2B and 3A/3B. The slider 600 of FIG. 6 further includes one or more conductive terminals 632 configured to connect to at least the read and write heads in the magnetic head assembly 630. The one or more conductive terminals 632 may comprise gold, silver, copper, platinum, or any other suitable material as would become apparent to one of skill in the art upon reading the present disclosure.

Sliders, such as those shown in FIG. 6, may be formed according to the following processes. Of course, more or less manufacturing steps may be used in forming said sliders, as would be apparent to one of skill in the art upon reading the present disclosure.

In preferred approaches, sliders may be built in wafer form, in which a plurality of magnetic head assemblies including magnetic read and write heads are formed on the surface of a ceramic wafer using thin film processing techniques (e.g., plating, sputtering, chemical vapor deposition, etc.). The wafer may preferably be formed of a ceramic composite material comprising $Al_2O_3$—TiC, as well as trace amounts of other materials, such as MgO. The magnetic head assemblies on the wafer may be encased in a film comprising, e.g., alumina or other such suitable material as would become apparent to one having skill in the art upon reading the present disclosure.

After formation of the magnetic head assemblies is complete, the wafer may be cut into four quadrants ("quads"). Each quad may then be subject to a lapping process to dimension the magnetic head assemblies therein. After lapping, single rowbars of sliders (each slider comprising a magnetic head assembly) are cut from the wafer quads. Each rowbar may be subject to an optional fine lapping process and/or cleaning process.

A thin primary overcoat ("a media facing side overcoat," "MFSOC") may be deposited on the MFS of each slider in a rowbar. In various approaches, the MFSOC may comprise diamond like carbon (DLC) or other suitable material as would become apparent to one having ordinary skill in the art upon reading the present disclosure.

A rail etching process may next be implemented to form a rail pattern including center and side rails, as well as other additional raised features, in the MFS of each slider in a rowbar. This rail etching process may utilize known lithographic and etching techniques. For instance, in some approaches, these raised features may be formed by coating the MFS of each slider with a thick layer of protective photoresist, imaging the photoresist with radiation to form a desired pattern, and transferring (e.g., via ion milling) the desired pattern into the body of the MFS of the slider. After one or more raised rail features have been formed, the remaining photoresist may be removed, such as by a chemical liftoff process utilizing a solvent. Each row bar may then be subsequently diced into individual sliders, each having a magnetic head assembly terminating at the MFS thereof.

As noted above, each slider in a rowbar may comprise a ceramic wafer, a magnetic head assembly formed on the ceramic wafer, and a film encasing/encapsulating the magnetic head assembly. In various approaches, the ceramic wafer and the film encasing the magnetic head assembly may comprise different materials that exhibit different etch rates when exposed to the same etchants and/or solvents. In one particular approach, the ceramic wafer may comprise primarily $Al_2O_3$—TiC, and the film encasing the magnetic head assembly may comprise primarily alumina ($Al_2O_3$). An alumina film may exhibit a faster etch rate than a $Al_2O_3$—TiC wafer; thus, the rail etching process may result in the areas of the slider comprising the alumina film being etched/recessed to a greater extent than those areas of the slider comprising the $Al_2O_3$—TiC wafer. The etch depth of the alumina film may continue to increase an unwanted amount relative to the etch depth of the $Al_2O_3$—TiC wafer with each etching step in the rail formation process. This recession of the film (e.g., an alumina film) encasing the magnetic head assembly relative to the material of the wafer (e.g., $Al_2O_3$—TiC) may lead to inconsistency in fly heights and thus inconsistency in read and write operations among the sliders formed from a single wafer.

Various exemplary embodiments described herein overcome the aforementioned drawbacks by providing a secondary protective film over one or more portions of the MFS of a slider to preserve the height of the film encasing a magnetic head assembly. In preferred embodiments, after an initial etching step to define a rail feature, such a secondary protective film is applied to one or more of the recessed portions of the MFS of a slider to reduce or eliminate the recession of the film encasing the magnetic head assembly during subsequent etching steps.

Referring now to FIGS. 7(A,B)-20(A,B), a method for applying a secondary protective film to at least one region of the media facing side (MFS) of a slider is shown, according to one embodiment. As an option, the present method may be implemented to construct structures such as those shown in the other figures. Of course, the present method and others presented herein may be used to form magnetic structures for a wide variety of devices and/or purposes which may or may not be related to magnetic recording. It should be noted that any aforementioned features may be used in any of the embodiments described in accordance with the various methods. It should also be noted that the present method may include more or less steps than those described and/or illustrated in FIGS. 7(A,B)-20(A,B), according to various approaches. Further, the present method and others presented herein may be carried out in any desired environment.

Figure 7A:
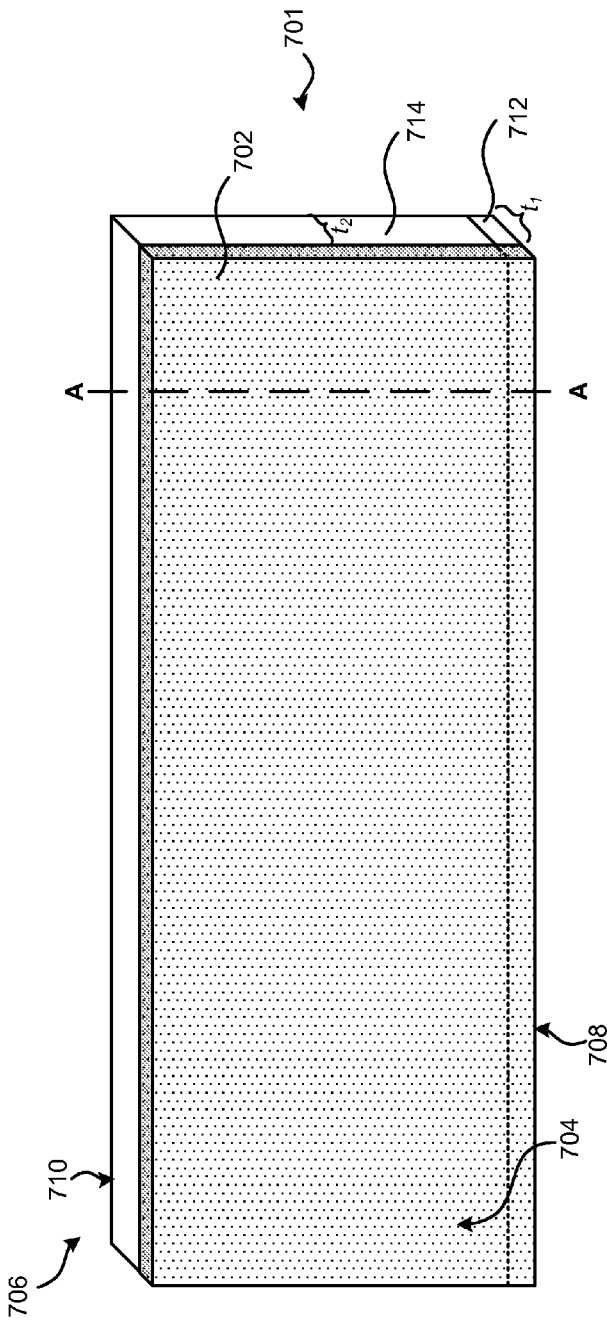
FIGS. 7(A,B)-20(A,B) provide various views of a rowbar including a plurality of sliders thereon in various intermediate states of manufacture, according to one embodiment.
Figure 7B:
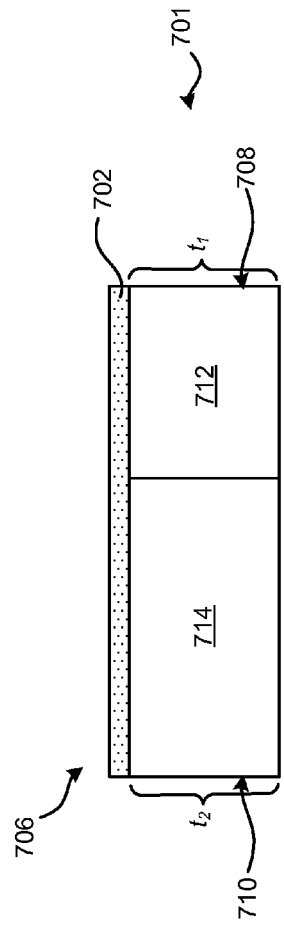

With reference to FIG. 7A, a primary overcoat (also referred to as a media facing side overcoat (MFSOC)) 702 is deposited on the MFS 704 of a rowbar 706. See MFS view of structure 701 (a side view of structure 701 taken along line AA is provided in FIG. 7B). In some approaches, the MFS 704 of the rowbar 706 may be optionally cleaned (e.g., via an ethanol wipe) prior to deposition of the MFSOC 702.

In some approaches, the thickness, $t_{MFSOC}$, of the MFSOC 702 may be in a range between about 1 nm to about 2 nm. In more approaches, the MFSOC 702 includes diamond like carbon or other suitable protective layer as would become apparent to one having skill in the art upon reading the present disclosure. In yet more approaches, the MFSOC 702 may include a single layer or have a multilayer structure. In one particular approach, the MFSOC 702 may comprise an adhesive layer (e.g., an amorphous silicon layer) and an amorphous carbon layer deposited thereabove. Deposition of the MFSOC 702 on the MFS 704 of a rowbar 706 may be achieved via one or more of: chemical vapor deposition, atomic layer deposition, an ion beam evaporation method, a laser abrasion evaporation method, and arc-discharge technique, or other techniques as would become apparent to one having skill in the art upon reading the present disclosure.

The rowbar 706 includes a trailing edge 708 and a leading edge 710. The rowbar 706 also includes a first region 712, and a second region 714 positioned behind the first region relative to the trailing edge 708. The thickness of the first region, $t_1$, is about equal to the thickness of the second region, $t_2$, in structure 701. In various approaches, the thickness of the first and/or second regions 712, 714 may be in a range between about 180 um to about 230 um.

In various approaches, the first region 712 and the second region 714 of the rowbar 706 may each include a ceramic material. In some approaches, the first and second regions 712, 714 may include different materials. In more approaches, the first region 712 may include a material that has an etch rate that is different than the etch rate of a material included in the second region 714. In particular approaches, the first region 712 may primarily include $Al_2O_3$, and the second region 714 may primarily include $Al_2O_3$—TiC.

Figure 8A:
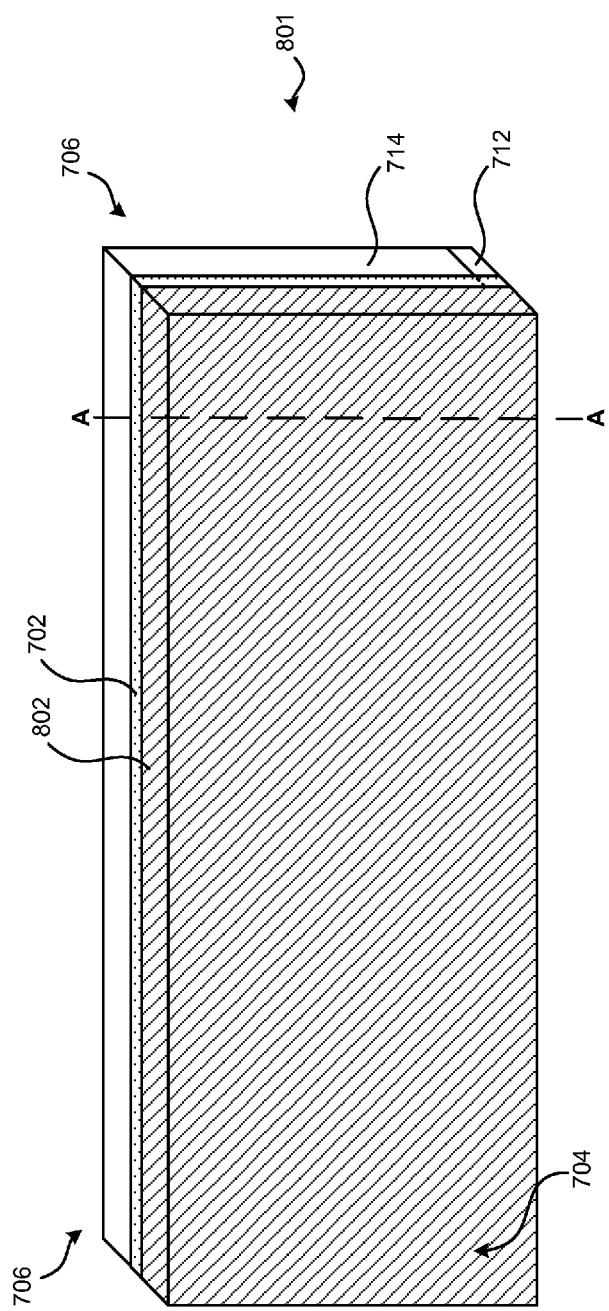
Figure 8B:
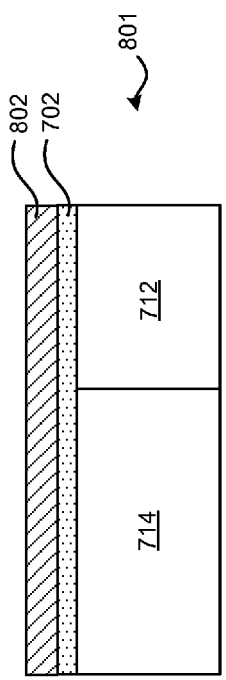

With reference to FIG. 8A, a first photoresist layer 802 is applied to the MFS of the rowbar 706 having the MFSOC 702 thereon. See MFS view of structure 801 (a side view of structure 801 taken along line AA is provided in FIG. 8B). In preferred approaches, the first photoresist layer 802 may be as thin as possible to maximize photolithographic resolution, while still being sufficiently thick to withstand an etching process (e.g., ion milling). The first photoresist layer 802 may be applied via spray coating, spin coating, lamination or direct printing or other suitable coating process as would become apparent to one having skill in the art upon reading the present disclosure. In preferred approaches, the thicknesses of the first and second regions 712, 714 of the rowbar 706 are not altered by the application of the first photoresist layer 802.

With reference to 9A, the first photoresist layer 802 is photolithographically patterned and developed to form a first photoresist mask 902 defining a first pattern. See MFS view of structure 901 (a side view of structure 901 taken along the bolded arrow is provided in FIG. 9B). The thicknesses of the first and second regions 712, 714 of the rowbar 706 are not altered by application and exposure of the first photoresist layer 802 on the MFS 704 of the rowbar 706 having the MFSOC 702 thereon.

With reference to FIG. 10A, a first etching step is performed to remove at least portions of the MFSOC 702 that are not covered by the first photoresist mask 902. See MFS view of structure 1001 (a side view of structure 1001 taken along the bolded arrow is provided in FIG. 10B). The resulting structure 1001 thus includes one or more protruding regions 1002 (which may form part of the rail structure) and one or more recessed regions 1004, as shown in FIG. 10B.

The first etching step may include ion milling, reactive ion etching (RIE), deep RIE, inductively coupled plasma RIE, or other suitable etching processes as would become apparent to one having skill in the art upon reading the present disclosure. In a preferred approach, the first ion milling step includes a standard (not deep) ion milling process.

In particular approaches, the first etching step may remove portions of the MFSOC 702 that is not covered by the first photoresist mask 902, as well as portions of the first and/or second region 712, 714 of the rowbar 706 positioned beneath the exposed MFSOC 702. In various approaches, the first region 712 may comprises a material having about an equal or faster etch rate compared to the material of the second region 714 when both materials are exposed to the same etching process. Accordingly, after the first etching step, the etch depth, $d_1$, of the first region 712 may be about equal to or greater than the etch depth, $d_2$, of the second region 714. In more approaches, the ratio ($d_1:d_2$) of the etch depth of the first region 712 to the etch depth of the second region 714 may be in a range from 1.6 to 1.9.

FIG. 10B provides a view of one such area of the rowbar 706 where the first etching step extended into the first and second regions 712, 714 thereof. FIG. 10B also illustrates an approach where the first region 712 comprises a material (e.g., alumina) having a faster etch rate compared to the material (e.g., $Al_2O_3$—TiC) of the second region 714 when both materials are exposed to the same etching process. Accordingly, as shown in FIG. 10C, the etch depth, $d_1$, of the first region 712 is greater than the etch depth, $d_2$, of the second region 714.

With reference to FIG. 11A, a secondary protective film 1102 is applied to the MFS 704 of the rowbar 706. See MFS view of structure 1101 (a side view of structure 1101 taken along the bolded arrow is provided in FIG. 11B). As shown in the embodiment of FIG. 11A, the secondary protective film 1102 may form a conformal coating on all exposed surfaces/regions (e.g., the recessed and protruding regions 1004, 1002) on the MFS 704 of the rowbar 706. Application of the secondary protective film to the MFS 704 of the rowbar 706 may be achieved via chemical vapor deposition, sputtering, atomic layer deposition, and other suitable thin film deposition techniques as would become apparent to one having skill in the art upon reading the present disclosure.

In various approaches, the secondary protective film 1102 may have a thickness in a range from about 0.1 nm to about 2.0 nm, preferably in a range from about 0.3 nm to about 1.0 nm. In some approaches, the secondary protective film 1102 may comprise, Si, SiN, SiC, carbon, and combinations thereof.

In preferred approaches, the secondary protective film 1102 may comprise a material configured to prevent recession of underlying layers during dry and chemical etching processes. Application of the secondary protective film 1102 to preserve the height of the layer(s) therebeneath during an etching process and/or exposure to a chemical solution may be particularly advantageous in approaches where the layer (s) is(are) comprised of a material susceptible to the etching process and/or chemical solution (e.g., in approaches where one or more portions of the material of the layer(s) would likely be removed during the etching process and/or exposure to the chemical solution). For instance, in approaches where the first region 712 comprises a soft material such as alumina, and the second region 714 comprises a hard material such as $Al_2O_3$—TiC, application of the secondary protective on the first and second regions 712, 714 may prevent any further decreases in the respective thicknesses (and increases in their respective etch depths) of the first and second regions 712, 714 during any subsequent etching processes and/or exposure to chemical solutions.

In some approaches, the secondary protective film 1102 may comprise a material configured to prevent recession of underlying layers during exposure to one or more of: ethanol, deionized water, PGMEA, NMP, PMER Developer P-6G, Semi Clean EP-11D, and other such chemical solution as would become apparent to one having skill in the art upon reading the present disclosure.

In alternative approaches, the secondary protective film 1102 may be applied only to the MFS of the first region 712 of rowbar 706, as shown in the alternative embodiment illustrated in FIGS. 21(A,B)-25(A,B).

With reference to FIG. 12A, the first photoresist mask 902 having the secondary protective film 1102 thereon is removed. See MFS view of structure 1201 (a side view of structure 1201 taken along the bolded arrow is provided in FIG. 12B). As shown in FIGS. 12A-12B, after removal of the first photoresist mask 902, the structure 1201 comprises protruding regions 1002 arranged according to the first pattern, and recessed regions 1004, where the media facing side of the protruding regions 1002 have the MFSOC 702 thereon, and where the media facing side of the recessed regions 1004 have the secondary protective film 1102 thereon.

In various approaches, the first photoresist mask 902 may be removed by a chemical liftoff process that includes the use of one or more chemical solutions, such as ethanol, deionized water, PGMEA, NMP, P-6G, EP-11D, etc. The thicknesses (and etch depth) of the first and second regions 712, 714 of the rowbar 706 having the secondary protective film 1102 thereon are not altered by the removal of the first photoresist mask 902.

Figure 13A:
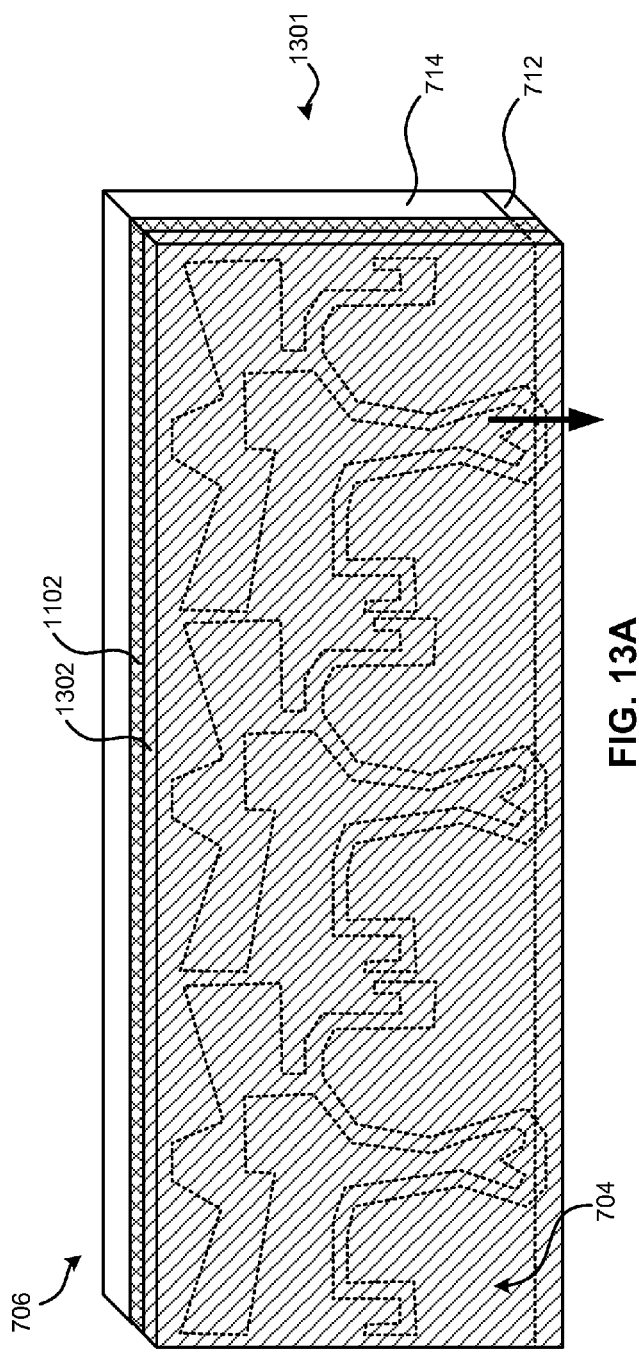
Figure 13B:
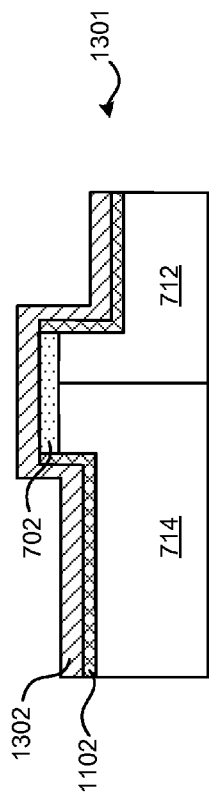

With reference to FIG. 13A, a second photoresist layer 1302 is applied to the MFS 704 of the rowbar 706. See MFS view of structure 1301 (a side view of structure 1301 taken along the bolded arrow is provided in FIG. 13B). In some approaches, the MFS 704 of the rowbar 706 may be optionally cleaned (e.g., via an ethanol wipe) prior to deposition of the second photoresist layer 1302.

As shown in the embodiment of FIG. 13A, the second photoresist layer 1302 may form a coating on all exposed regions of the MFS 704 of the rowbar 706. In preferred approaches, the second photoresist layer 1302 may be as thin as possible to maximize photolithographic resolution, while still being sufficiently thick to withstand an etching process (e.g., ion milling). The second photoresist layer 1302 may be applied via spray coating, spin coating, lamination or direct printing or other suitable coating process as would become apparent to one having skill in the art upon reading the present disclosure. The thicknesses (and etch depth) of the first and second regions 712, 714 of the rowbar 706 having the secondary protective film 1102 thereon are not altered by the optional cleaning process (e.g., an ethanol wipe) or the application of the second photoresist layer 1302.

With reference to FIG. 14A, the second photoresist layer 1302 is photolithographically patterned and developed to form a second photoresist mask 1402 defining a second pattern. See MFS view of structure 1401 (a side view of structure 1401 taken along line the bolded arrow is provided in FIG. 14B). The thicknesses of the first and second regions 712, 714 of the rowbar 706 having the secondary protective film 1102 thereon are not altered by application and exposure of the second photoresist layer 1302 on the MFS 704 of the rowbar 706.

With reference to FIG. 15A, a second etching step is performed to remove portions of the MFS 704 of the rowbar 706 that are not covered by the second photoresist mask 1402. See MFS view of structure 1501 (a side view of structure 1501 taken along the bolded arrow is provided in FIG. 15B). As shown in FIG. 15A, portions of the secondary protective film 1102 that are not covered by the second photoresist mask 1402 may be removed. In some approaches, the etching of portions of the secondary protective film 1102 not covered by the second photoresist mask 1402 may extend into underlying portions of the rowbar 706. In particular approaches, the second etching step may remove one or more portions of the MFS 704 of the rowbar 706 that were not removed in the first etching step described in FIGS. 10A-10B.

The second etching step of FIGS. 15A-15B may include ion milling, reactive ion etching (RIE), deep RIE, inductively coupled plasma RIE, or other suitable etching processes as would become apparent to one having skill in the art upon reading the present disclosure. In a preferred approach, the second etching step may include a deep ion milling process.

The thicknesses of the first and second regions 712, 714 of the rowbar 706 having the secondary protective film 1102 thereon, and which were not covered by the second photoresist mask 1402, are not altered by performance of the second etching process.

With reference to FIG. 16A, the second photoresist mask 1402 is removed. See MFS view of structure 1601 (a side view of structure 1601 taken along the bolded arrow is provided in FIG. 16B). In various approaches, the second photoresist mask 1402 may be removed by a chemical liftoff process that includes the use of one or more chemical solutions, such as ethanol, deionized water, PGMEA, NMP, PMER Developer P-6G, Semi Clean EP-11D, etc. The thicknesses (and etch depth) of the first and second regions 712, 714 of the rowbar 706 having the secondary protective film 1102 thereon are not altered by the removal of the second photoresist mask 1402.

With reference to FIG. 17A, a third photoresist layer 1702 is applied to the MFS 704 of the rowbar 706. See MFS view of structure 1701 (a side view of structure 1701 taken along the bolded arrow is provided in FIG. 17B). In some approaches, the MFS 704 of the rowbar 706 may be optionally cleaned (e.g., via an ethanol wipe) prior to deposition of the third photoresist layer 1702.

As shown in the embodiment of FIG. 17A, the third photoresist layer 1702 may form a coating on all exposed regions of the MFS 704 of the rowbar 706. In preferred approaches, the third photoresist layer 1702 may be as thin as possible to maximize photolithographic resolution, while still being sufficiently thick to withstand an etching process (e.g., ion milling). The third photoresist layer 1702 may be applied via spray coating, spin coating, lamination or direct printing or other suitable coating process as would become apparent to one having skill in the art upon reading the present disclosure. The thicknesses (and etch depth) of the first and second regions 712, 714 of the rowbar 706 having the secondary protective film 1102 thereon are not altered by the optional cleaning process or the application of the third photoresist layer 1702.

With reference to FIG. 18A, the third photoresist layer 1702 is photolithographically patterned and developed to form a third photoresist mask 1802 defining a third pattern.

See MFS view of structure 1801 (a side view of structure 1801 taken along the bolded arrow is provided in FIG. 18B). The thicknesses of the first and second regions 712, 714 of the rowbar 706 having the secondary protective film 1102 thereon are not altered by application and exposure of the third photoresists layer 1702 on the MFS 704 of the rowbar 706.

With reference to FIG. 19A, a third etching step is performed to remove portions of the MFS 704 of the rowbar 706 that are not covered by the third photoresist mask 1802. See MFS view of structure 1901 (a side view of structure 1901 taken along the bolded arrow is provided in FIG. 19B). In particular approaches, the third etching step may remove one or more portions of the MFS 704 of the rowbar 706 that were not removed in the first and/or the second etching step described in FIGS. 10A-10B and 15A-15B, respectively.

The third etching step of FIGS. 19A-19B may include ion milling, reactive ion etching (RIE), deep RIE, inductively coupled plasma RIE, or other suitable etching processes as would become apparent to one having skill in the art upon reading the present disclosure. In a preferred approach, the third etching step may include a deep ion milling process.

The thicknesses of the first and second regions 712, 714 of the rowbar 706 having the secondary protective film 1102 thereon, and which were not covered by the third photoresist mask 1802, are not altered by performance of the third etching process.

With reference to FIG. 20A, the third photoresist mask 1802 is removed. See MFS view of structure 2001 (a side view of structure 2001 taken along the bolded arrow is provided in FIG. 20B). In various approaches, the third photoresist mask 1802 may be removed by a chemical liftoff process that includes the use of one or more chemical solutions, such as ethanol, deionized water, PGMEA, NMP, P-6G, EP-11D, etc. The thicknesses (and etch depth) of the first and second regions 712, 714 of the rowbar 706 having the secondary protective film 1102 thereon are not altered by the removal of the third photoresist mask 1802.

In some approaches, one or more remaining portions of the secondary protective film 1102 may be removed from the MFS of the structure 2001.

In other approaches, the resulting structure 2001 may retain the portions of the secondary protective film 1102 that were not removed during the etching steps. In approaches where the resulting structure 2001 comprises the portions of the secondary protective film 1102 that were not removed during the etching steps, the thickness of the secondary protective film 1102 may be in a range from about 0.1 nm to about 2.0 nm, preferably in a range from about 0.3 nm to about 1.0 nm.

The resulting structure 2001 may retain the portions of the secondary protective film 1102 that were not removed during the etching steps particularly in approaches where the secondary protective film 1102 has a similar composition as compared to the MFSOC 702. Moreover, the remaining portions of the MFSOC 702 are preferably not removed from the MFS of the structure 2001.

It is important to note that the method described above in FIGS. 7(A,B)-20(A,B) may include more or less etching cycles (e.g., optional cleaning process, application and patterning of a photoresist mask, removal of portions of the MFS of the rowbar not covered by the photoresist mask, etc.) than those described above. However, it is also important to note that application of the secondary protective film 1102 to the MFS 704 of the rowbar 706 after a first etching cycle prevents further decreases in the thickness (and increases in the etch depth) of those regions coated with the secondary protective film 1102 during subsequent etching cycles. For instance, comparison of structure 1201 of FIG. 12B, resulting after the first etching cycle, and structure 2001 of FIG. 20B, resulting after the third etching cycle, reveals that the thickness (and etch depth) of the respective regions of the rowbar previously coated with the secondary protective film 1102 remains unchanged despite performance of the second and third etching cycles. Stated another way, the ratio of the etch depth of the first region 712 to that of the second region 714 is primarily the same in structure 1201 of FIG. 12B and structure 2001 of FIG. 20B.

FIGS. 21(A,B)-25(A,B) illustrate a first alternative embodiment in which the secondary protective film 1102 may be applied only to the first region 712 of the rowbar 706 after the first etching step shown in FIGS. 10A-10B. For instance, as shown in FIG. 21A, after the first etching step and prior to deposition of the secondary protective film 1102, the first photoresist mask 902 may be removed via a chemical liftoff process. See MFS view of structure 2101 (a side view of structure 2101 taken along the bolded arrow is provided in FIG. 21B). As shown in FIGS. 21A-21B, after removal of the first photoresist mask 902, the structure 1201 comprises protruding regions 1002 arranged according to the first pattern (as specified by the first photoresist mask 902), and recessed regions 1004, where the media facing side of the protruding regions 1002 have the MFSOC 702 thereon.

Continuing with this first alternative embodiment, an optional photoresist layer 2202 may be applied to the MFS 704 of the rowbar 706, as shown in FIG. 22A. See MFS view of structure 2201 (a side view of structure 2201 taken along the bolded arrow is provided in FIG. 22B). In some approaches, the MFS 704 of the rowbar 706 may be optionally cleaned (e.g., via an ethanol wipe) prior to deposition of the optional photoresist layer 2202. As shown in the embodiment of FIG. 22A, the optional photoresist layer 2202 may form a coating on all exposed regions of the MFS 704 of the rowbar 706. In preferred approaches, the optional photoresist layer 2202 may be as thin as possible to maximize photolithographic resolution, while still being sufficiently thick to withstand an etching process (e.g., ion milling). The optional photoresist layer 2202 may be applied via spray coating, spin coating, lamination or direct printing or other suitable coating process as would become apparent to one having skill in the art upon reading the present disclosure.

Still with reference to this first alternative embodiment, the optional photoresist layer 2202 may be photolithographically patterned and developed to form an optional photoresist mask 2302 defining an optional pattern. See MFS view of structure 2301 (a side view of structure 2301 taken along the bolded arrow is provided in FIG. 23B). As particularly shown in FIG. 23A, the optional photoresist mask 2302 covers only the second region 714 of the rowbar 706, while leaving the first region 712 of the rowbar 706 exposed.

Again with reference to this first alternative embodiment, after developing the optional photoresist mask 2302, the secondary protective film 1102 may then be applied to the MFS 704 of the rowbar 706, as shown in FIG. 24A. See MFS view of structure 2401 (a side view of structure 2401 taken along the bolded arrow is provided in FIG. 24B). As shown in the embodiment of FIG. 24A, the secondary protective film 1102 may form a conformal coating on all exposed surfaces/regions on the MFS 704 of the rowbar 706.

With continued reference to this first alternative embodiment, the optional photoresist mask 2302 having the secondary protective film 1102 thereon may then be removed, e.g., via a chemical liftoff process, as shown in FIG. 25A. See MFS view of structure 2501 (a side view of structure 2501 taken along the bolded arrow is provided in FIG. 25B). As shown in FIGS. 25A-25B, after removal of the optional photoresist mask 2302, only the recessed portion 1004 of the first region 712 has the secondary protective film 1102 thereon. The structure 2501 may subsequently be exposed to one or more of the steps described above in FIGS. 13(A,B)-20(A,B), such as the second and third etching cycles. Application of the secondary protective film 1102 to the MFS 704 of only the first region 712 after the first etching cycle may also prevent further decreases in the thickness (and increases in the etch depth) of those portions of the first region 712 coated with the secondary protective film 1102 during subsequent etching cycles. For instance, the thickness (and etch depth) of the portions of the first region 712 of the rowbar 706 coated with the secondary protective film 1102 may remain unchanged despite performance of the second and/or third etching cycles.

FIG. 26A illustrates a second alternative embodiment in which the secondary protective film 1102 was not applied to the MFS 704 of the rowbar 706 after the first etching step. See MFS view of structure 2601 (a side view of structure 2601 taken along the bolded arrow is provided in FIG. 26B). The formation of structure 2601 is substantially similar to the formation of structure 2001 of FIGS. 20A-20B, e.g., includes at least three etching cycles, with the exception that formation of structure 2601 of FIGS. 26A-26B does not include application of the secondary protective film to the MFS of the rowbar after the first etching step.

As shown in FIGS. 26A-26B, the second and/or third etching steps may lead to successive decreases in the thicknesses of the first and/or second regions 712, 714 of the rowbar 706. Moreover, in approaches where the secondary protective film 1102 is absent, the first region 712 comprises a soft material such as alumina, and the second region 714 comprises a hard material such as $Al_2O_3$—TiC, the second and third etching steps may successively increase the relative difference between the etch depth ($d_1'$) of the first region 712 and the etch depth ($d_2'$) of the second region 714. Accordingly, the difference between the etch depth ($d_1'$) of the first region 712 and etch depth ($d_2'$) of the second region in structure 2601 of FIG. 26B may be greater than the difference between the etch depth ($d_1$) of the first region 712 and etch depth ($d_2$) of the second region in structure 2001 of FIG. 20B.

Figure 27:
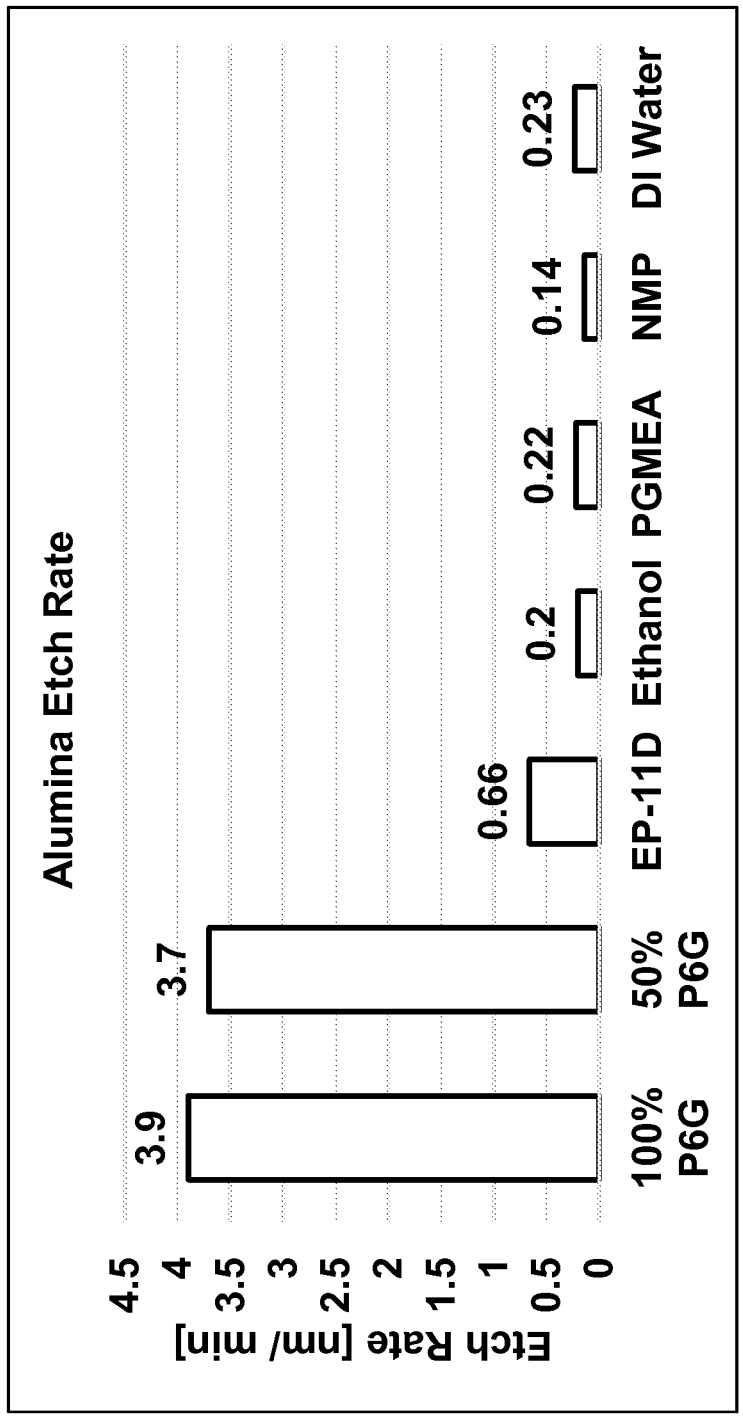
FIG. 27 is a graph of alumina etch rates in various chemicals.

Referring now to FIG. 27, a graph of alumina etch rates in various chemicals is shown. One or more of the chemicals shown in FIG. 22 may be used during one or more of the etch cycles described above in FIGS. 7(A,B)-20(A,B), such as during the removal of the photoresists masks. It has been found that application of a secondary protective film, such as those described here, to regions of a substrate or rowbar that primarily comprise alumina may reduce and/or eliminate the recession of the alumina during one or more etching cycles.

Figure 28B:
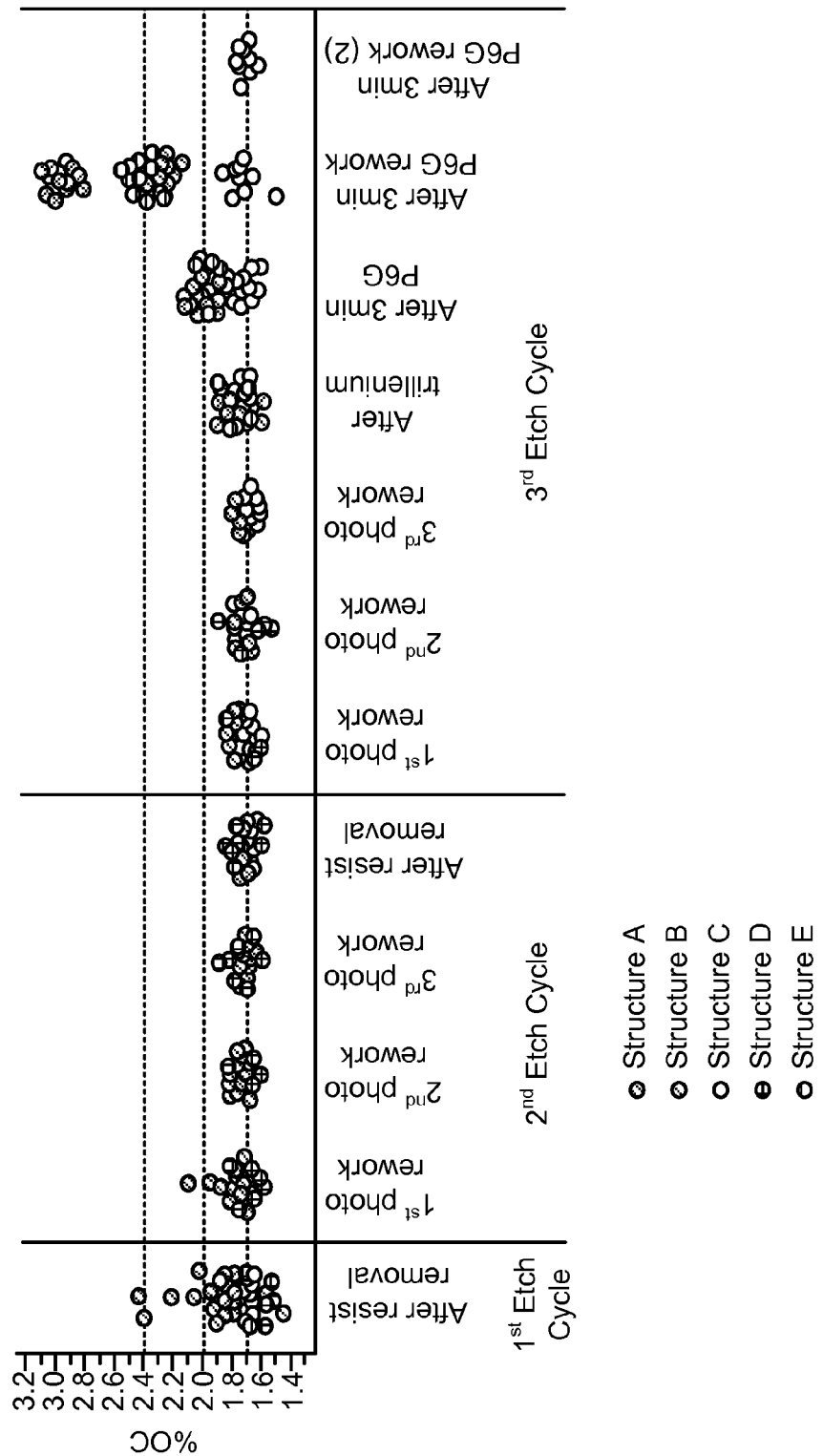
FIG. 28B is a plot of the data provided in FIG. 23A.

FIG. 28A provides a table comparing ratios of alumina to $Al_2O_3$—TiC etch depths for various exemplary rowbars, which either include or do not include a secondary protective film as described herein. FIG. 28B provides a visual representation of the data summarized in FIG. 28A.

Each of the exemplary rowbars referenced in FIGS. 28A-28B include a trailing edge, a leading edge, a first region comprising the alumina, and a second region comprising the $Al_2O_3$—TiC positioned behind the first region relative to the trailing edge. Each of these exemplary rowbars is also subject to three etching cycles, such as those described above. The second and third etching cycles described in FIGS. 28A-28B additionally include $1^{st}$, $2^{nd}$, and $3^{rd}$ photo rework steps, each of which involve a complete photolithography process (e.g., photoresist layer application, photolithography patterning (exposure) and developing steps). These $1^{st}$, $2^{nd}$, and $3^{rd}$ photo rework steps are non-standard process steps that were performed for evaluation purposes. The second and third etching cycles described in FIGS. 28A-28B also include a resist lift-off/removal process with the use of PGMEA and an automated brushing technique with a SSEC Trillenium strip tool.

As shown in FIGS. 28A-28B, for a rowbar having the secondary protective film, the ratio of the alumina etch depth to the $Al_2O_3$—TiC etch depth remains about equal during the first, second and third etching steps. Conversely, for a rowbar that does not have the secondary protective film, the ratio of the alumina etch depth to the $Al_2O_3$—TiC etch depth increases with each successive etching step (i.e., from the first etching step to the third etching step).

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head slider, comprising:
   a leading edge, and a trailing edge;
   a media facing side (MFS) extending between the leading edge and the trailing edge;
   a first region located near the trailing edge, the first region having an upper surface;
   a second region located between the first region and the leading edge, the second region having an upper surface;
   a center rail comprising: a forward segment protruding from the upper surface of the first region of the slider, and a posterior segment protruding from the upper surface of the second region of the slider;
   a rear rail protruding from the upper surface of the second region of the slider; and
   a secondary protective film deposited on a majority of the upper surface of the first region,
   wherein the upper surface of the second region of the slider does not have the secondary protective film deposited thereon,
   wherein the secondary protective film has a thickness in a range from about 0.1 nm to about 2.0 nm.

2. The magnetic head slider as recited in claim 1, wherein the secondary protective film comprises one or more of Si, SiC, SiN, and carbon.

3. The magnetic head slider as recited in claim 1, wherein the first region has an etch rate that is different than an etch rate of the second region, wherein the secondary protective film is configured to protect a thickness of the first region, the thickness of the first region being measured in a direction normal to the MFS of the magnetic head slider.

4. The magnetic head slider as recited in claim 1, wherein the first region comprises primarily alumina.

5. The magnetic head slider as recited in claim 1, wherein the second region comprises primarily $Al_2O_3$—TiC.

6. The magnetic head slider as recited in claim 1, further comprising a primary overcoat deposited on at least one portion of the center rail.

7. The magnetic head slider as recited in claim 6, wherein the primary overcoat comprises diamond like carbon.

8. The magnetic head slider as recited in claim 1, wherein the secondary protective film is deposited on at least one portion of the center rail.

9. The magnetic head slider as recited in claim 1, wherein the forward segment of the center rail comprises primarily alumina, wherein the posterior segment of the center rail comprises primarily $Al_2O_3$—TiC.

10. The magnetic head slider as recited in claim 1, wherein the rear rail comprises primarily $Al_2O_3$—TiC.

11. The magnetic head slider as recited in claim 1, further comprising a transducer positioned near the trailing edge.

12. A magnetic data storage system, comprising:
at least one magnetic head slider as recited in claim 1;
a magnetic medium;
a drive mechanism for passing the magnetic medium over the at least one magnetic head slider; and
a controller electrically coupled to the at least one magnetic head slider for controlling operation of the at least one magnetic head slider.

13. The magnetic head slider as recited in claim 1, wherein a ratio of a thickness of the forward segment of the center rail protruding from the first region to a thickness of the posterior segment of the center rail protruding from the second region is in a range from 1.6 to 1.9.

14. The magnetic head slider as recited in claim 1, further comprising a primary overcoat deposited on at least one portion of the center rail and at least one portion of the rear rail.

15. A magnetic head slider, comprising:
a leading edge, and a trailing edge;
a media facing side (MFS) extending between the leading edge and the trailing edge;
a first region located near the trailing edge, the first region having an upper surface;
a second region located between the first region and the leading edge, the second region having an upper surface;
a center rail comprising: a forward segment protruding from the upper surface of the first region of the slider, and a posterior segment protruding from the upper surface of the second region of the slider;
a rear rail protruding from the upper surface of the second region of the slider;
a secondary protective film deposited on a majority of the upper surface of the first region, and
a primary overcoat deposited on at least one portion of the rear rail,
wherein the upper surface of the second region of the slider does not have the secondary protective film deposited thereon.

16. The magnetic head slider as recited in claim 15, wherein the primary overcoat comprises diamond like carbon.

17. A magnetic head slider, comprising:
a leading edge, and a trailing edge;
a media facing side (MFS) extending between the leading edge and the trailing edge;
a first region located near the trailing edge, the first region having an upper surface;
a second region located between the first region and the leading edge, the second region having an upper surface;
a center rail comprising: a forward segment protruding from the upper surface of the first region of the slider, and a posterior segment protruding from the upper surface of the second region of the slider;
a rear rail protruding from the upper surface of the second region of the slider; and
a secondary protective film deposited on a majority of the upper surface of the first region,
wherein the upper surface of the second region of the slider does not have the secondary protective film deposited thereon,
wherein the secondary protective film is deposited on at least one portion of the rear rail.

* * * * *